United States Patent
Pan et al.

(10) Patent No.: US 11,582,768 B2
(45) Date of Patent: *Feb. 14, 2023

(54) METHOD AND APPARATUS FOR REQUESTING SIDELINK TRANSMISSION RESOURCES IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/472,894

(22) Filed: Sep. 13, 2021

(65) Prior Publication Data
US 2021/0410153 A1    Dec. 30, 2021

Related U.S. Application Data

(63) Continuation of application No. 17/084,079, filed on Oct. 29, 2020, now Pat. No. 11,147,080.

(60) Provisional application No. 62/934,738, filed on Nov. 13, 2019.

(51) Int. Cl.
| | |
|---|---|
| H04W 72/08 | (2009.01) |
| H04W 4/40 | (2018.01) |
| H04W 92/18 | (2009.01) |
| H04W 28/02 | (2009.01) |
| H04W 88/04 | (2009.01) |
| H04W 24/10 | (2009.01) |
| H04W 76/11 | (2018.01) |
| H04W 76/14 | (2018.01) |
| H04W 84/04 | (2009.01) |

(52) U.S. Cl.
CPC ......... H04W 72/087 (2013.01); H04W 4/40 (2018.02); H04W 24/10 (2013.01); H04W 28/0278 (2013.01); H04W 76/11 (2018.02); H04W 76/14 (2018.02); H04W 84/047 (2013.01); H04W 88/04 (2013.01); H04W 92/18 (2013.01)

(58) Field of Classification Search
CPC ... H04W 24/10; H04W 4/40; H04W 28/0278; H04W 72/087; H04W 76/11; H04W 76/14; H04W 84/047; H04W 88/04; H04W 92/18
See application file for complete search history.

(56) References Cited

U.S. PATENT DOCUMENTS

| | | |
|---|---|---|
| 2018/0332585 A1 | 11/2018 | Faurie et al. |
| 2019/0387446 A1 | 12/2019 | Xu et al. |
| 2020/0037190 A1 | 1/2020 | Wu et al. |

(Continued)

OTHER PUBLICATIONS

Corresponding European Patent Application No. 20204517.5, Extended European Search Report dated Mar. 26, 2021.

(Continued)

*Primary Examiner* — Jaime M Holliday
(74) *Attorney, Agent, or Firm* — Cooper Legal Group LLC

(57) ABSTRACT

A method and apparatus are disclosed from the perspective of a first User Equipment (UE) in RRC_CONNECTED to request sidelink resources. In one embodiment, the method transmits a first RRC (Radio Resource Control) message to a network node, wherein a presence of a sidelink QoS (Quality of Service) information list in the first RRC message is optional.

20 Claims, 15 Drawing Sheets

(56) References Cited

U.S. PATENT DOCUMENTS

| | | | |
|---|---|---|---|
| 2020/0245113 A1* | 7/2020 | Kang | ................ H04W 40/246 |
| 2020/0314612 A1 | 10/2020 | Kang et al. | |
| 2020/0314613 A1* | 10/2020 | Lee | ...................... H04W 4/70 |
| 2020/0314959 A1 | 10/2020 | Agiwal et al. | |
| 2020/0396720 A1 | 12/2020 | Li et al. | |

OTHER PUBLICATIONS

HiSilicon Huawei, "Remaining Issues on SLRB Configuration", 3GPP TSG-RAN WG2 Meeting #107 bis, R2-1913712, Agenda Item 6.4.6, Document for Discussion and Decision, Oct. 14-18, 2019, ChongQing, China.

HiSilicon Huawei, "Further Details of Us RRC Procedures for Sidelink", 3GPP TSG-RAN WG2 Meeting #107 bis, R2-1913708, Agenda Item 6.4.2, Document for Discussion and Decision, Oct. 14-18, 2019, ChongQing, China.

ZTE, Sanechips, "Further Discussion on Sidelink RLC AM and UM for Unicast", 3GPP TSG-RAN WG2 Meeting #108, R2-1914547, Agenda Item 6.4.2, Document for Discussion and Decision, Nov. 18-22, 2019, Reno, NV, USA.

Study on NR Vehicle-to-Everything (V2X), 3GPP TR 38.885, version 16.0.0, release 16, Mar. 2019.

HiSilicon Huawei, "Details about NR SL QoS Handling", 3GPP TSG-RAN WG2 Meeting #106, R2-1907454, Agenda Item 11.4.6, Document for Discussion and Decision, May 13-17, 2019, Reno, NV, USA.

* cited by examiner

METHOD AND APPARATUS FOR REQUESTING SIDELINK TRANSMISSION RESOURCES IN A WIRELESS COMMUNICATION SYSTEM

CROSS-REFERENCE TO RELATED APPLICATIONS

The present Application claims priority to and is a continuation of U.S. application Ser. No. 17/084,079, filed on Oct. 29, 2020, entitled "METHOD AND APPARATUS FOR REQUESTING SIDELINK TRANSMISSION RESOURCES IN A WIRELESS COMMUNICATION SYSTEM", the entire disclosure of which is incorporated herein in its entirety by reference. U.S. application Ser. No. 17/084,079 claims the benefit of U.S. Provisional Patent Application Ser. No. 62/934,738 filed on Nov. 13, 2019, the entire disclosure of which is incorporated herein in its entirety by reference.

FIELD

This disclosure generally relates to wireless communication networks, and more particularly, to a method and apparatus for requesting sidelink transmission resources in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first User Equipment (UE) in RRC_CONNECTED to request sidelink resources. In one embodiment, the method transmits a first RRC (Radio Resource Control) message to a network node, wherein a presence of a sidelink QoS (Quality of Service) information list in the first RRC message is optional.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 23.287 V16.0.0, "Architecture enhancements for 5G System (5GS) to support Vehicle-to-Everything (V2X) services (Release 16)"; S2-1910019, "Use of unicast L2 ID for unicast link establishment"; TS 33.303 V15.0.0, "Proximity-based Services (ProSe); Security aspects (Release 15); TR 38.885 V16.0.0, "NR; Study on NR Vehicle-to-Everything (V2X) (Release 16)"; TS 36.331 V15.3.0 "Radio Resource Control (RRC); Protocol specification (Release 15)"; 3GPP email discussion [107bis #91][V2X] 38.331 running CR (Huawei), draft_R2-191xxx_Running CR to TS 38.331 for 5G V2X with NR Sidelink_v5; and R2-1914138, "Report from session on LTE V2X and NR V2X". The standards and documents listed above are hereby expressly incorporated by reference in their entirety.

Figure 1:
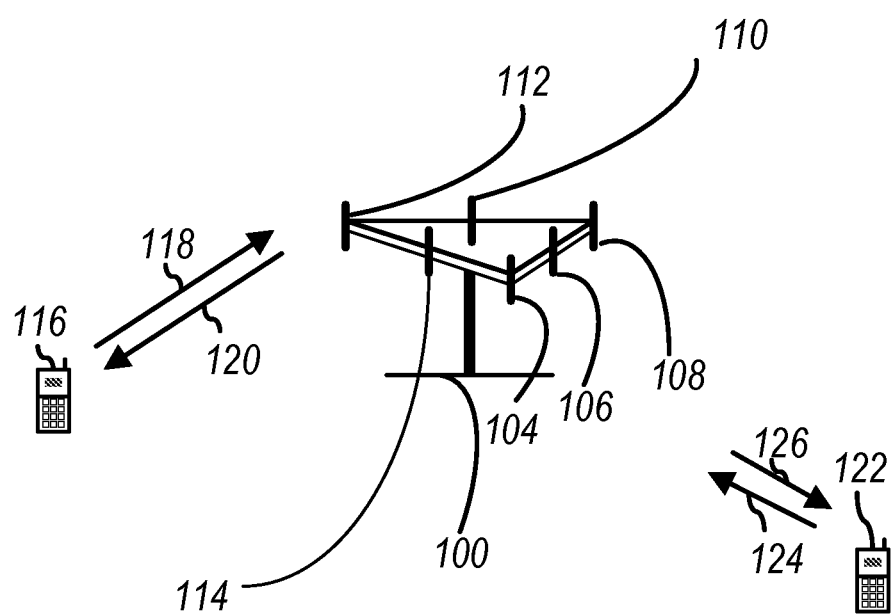
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
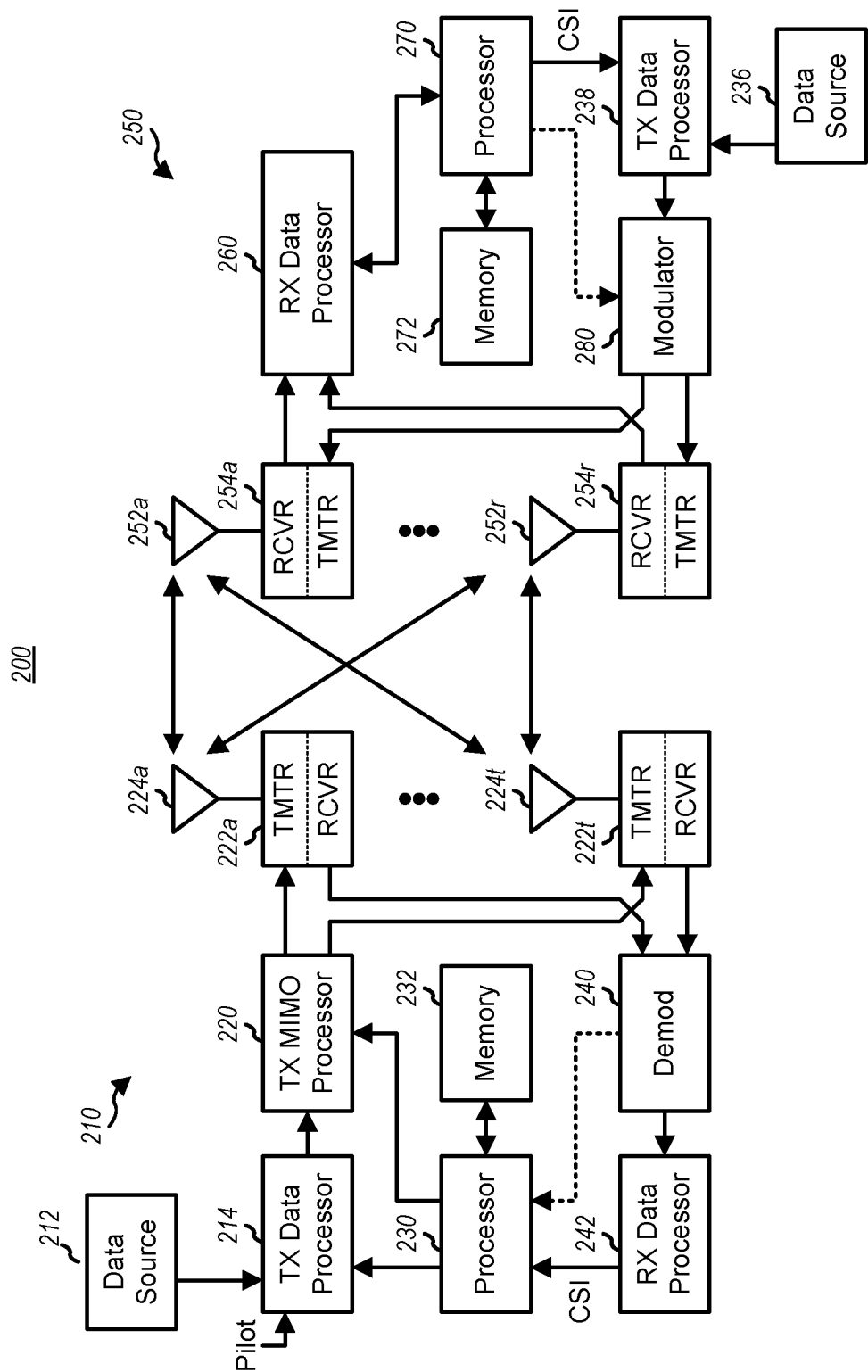
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
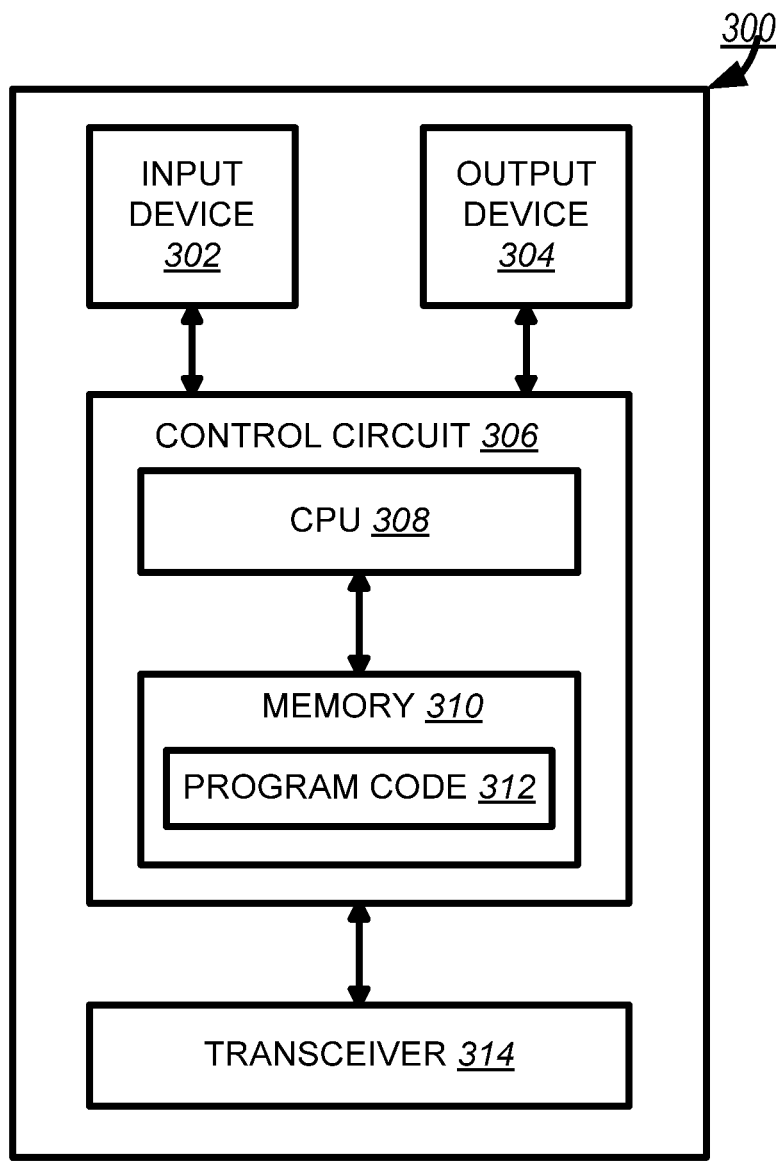
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
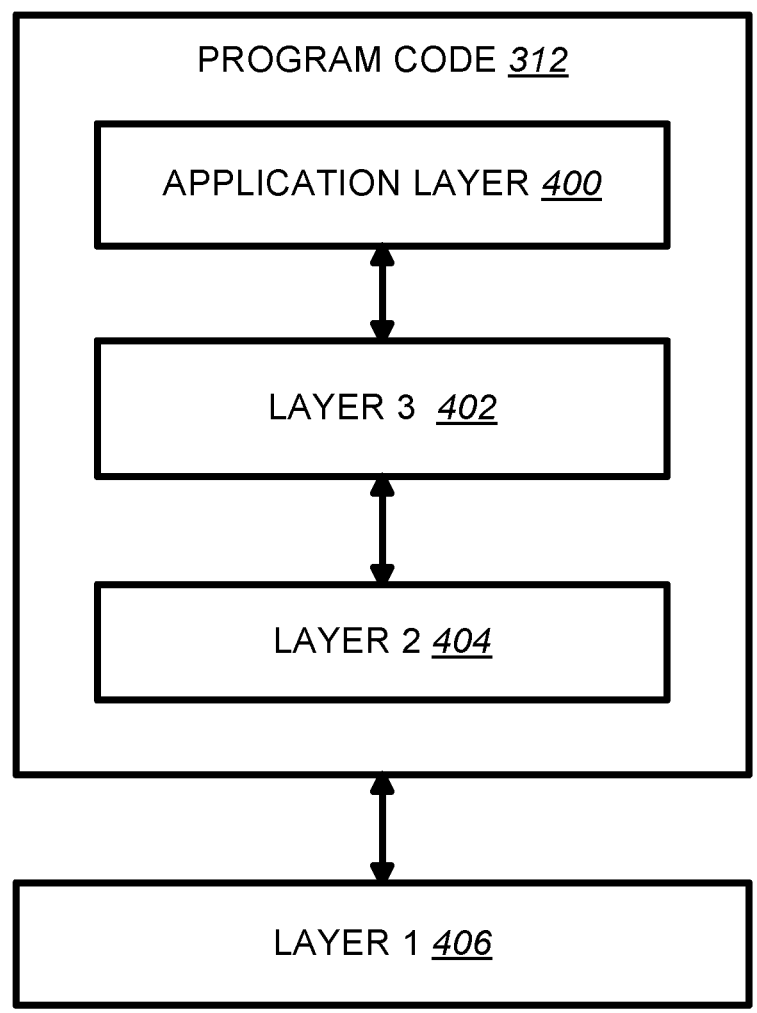
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.287 specifies V2X (Vehicle-to-Everything) communication related to unicast mode as follows:

5.1.2 Authorization and Provisioning for V2X Communications Over PC5 Reference Point 5.1.2.1 Policy/Parameter Provisioning The following information for V2X communications over PC5 reference point is provisioned to the UE:

1) Authorization policy:

When the UE is "served by E-UTRA" or "served by NR":

PLMNs in which the UE is authorized to perform V2X communications over PC5 reference point when "served by E-UTRA" or "served by NR".

For each above PLMN:

RAT(s) over which the UE is authorized to perform V2X communications over PC5 reference point.

When the UE is "not served by E-UTRA" and "not served by NR":

Indicates whether the UE is authorized to perform V2X communications over PC5 reference point when "not served by E-UTRA" and "not served by NR".

RAT(s) over which the UE is authorized to perform V2X communications over PC5 reference point.

2) Radio parameters when the UE is "not served by E-UTRA" and "not served by NR":

Includes the radio parameters per PC5 RAT (i.e. LTE PC5, NR PC5) with Geographical Area(s) and an indication of whether they are "operator managed" or "non-operator managed". The UE uses the radio parameters to perform V2X communications over PC5 reference point when "not served by E-UTRA" and "not served by NR" only if the UE can reliably locate itself in the corresponding Geographical Area. Otherwise, the UE is not authorized to transmit.

Editor's note: The radio parameters (e.g. frequency bands) are to be defined by RAN WGs. The reference to RAN specification will be added when defined in RAN WGs.

NOTE 1: Whether a frequency band is "operator managed" or "non-operator managed" in a given Geographical Area is defined by local regulations.

3) Policy/parameters per RAT for PC5 Tx Profile selection:

The mapping of service types (e.g. PSIDs or ITS-AIDs) to Tx Profiles.

Editor's note: The Tx Profiles are to be defined by RAN WGs. The reference to RAN specification will be added when defined in RAN WGs.

4) Policy/parameters related to privacy:

The list of V2X services, e.g. PSIDs or ITS-AIDs of the V2X applications, with Geographical Area(s) that require privacy support.

5) Policy/parameters when LTE PC5 is selected:

Same as specified in TS 23.285 [8] clause 4.4.1.1.2 item 3) Policy/parameters except for the mapping of service types to Tx Profiles and the list of V2X services with Geographical Area(s) that require privacy support.

6) Policy/parameters when NR PC5 is selected:

The mapping of service types (e.g. PSIDs or ITS-AIDs) to V2X frequencies with Geographical Area(s).

The mapping of Destination Layer-2 ID(s) and the V2X services, e.g. PSIDs or ITS-AIDs of the V2X application for broadcast.

The mapping of Destination Layer-2 ID(s) and the V2X services, e.g. PSIDs or ITS-AIDs of the V2X application for groupcast.

The mapping of default Destination Layer-2 ID(s) for initial signalling to establish unicast connection and the V2X services, e.g. PSIDs or ITS-AIDs of the V2X application.

NOTE 2: The same default Destination Layer-2 ID for unicast initial signalling can be mapped to more than one V2X services. In the case where different V2X services are mapped to distinct default Destination Layer-2 IDs, when the UE intends to establish a single unicast link that can be used for more than one V2X services, the UE can select any of the default Destination Layer-2 IDs to use for the initial signalling.

PC5 QoS mapping configuration:

Input from V2X application layer:

V2X service (e.g. PSID or ITS-AID).

(Optional) V2X Application Requirements for the V2X service, e.g. priority requirement, reliability requirement, delay requirement, range requirement.

NOTE 3: Details of V2X Application Requirements for the V2X service is up to implementation and out of scope of this specification.

Output:

PC5 QoS parameters defined in clause 5.4.2 (i.e. PQI and conditionally other parameters such as MFBR/GFBR, etc.).

SLRB configurations, i.e. the mapping of PC5 QoS profile(s) to SLRB(s), when the UE is "not served by E-UTRA" and "not served by NR".

The PC5 QoS profile contains PC5 QoS parameters described in clause 5.4.2, and value for the QoS characteristics regarding Priority Level, Averaging Window, Maximum Data Burst Volume if default value is not used as defined in Table 5.4.4-1.

Editor's note: The SLRB configurations will be determined by RAN WGs. The reference to RAN specification will be added when defined in RAN WGs.

Editor's note: For the PC5 QoS profile, coordination with RAN WGs is needed.

Editor's note: The V2X frequencies with Geographical Area(s) will be determined by RAN WGs. The reference to RAN specification will be added when defined in RAN WGs.

5.2.1.4 Unicast Mode Communication Over PC5 Reference Point

Figure 5:
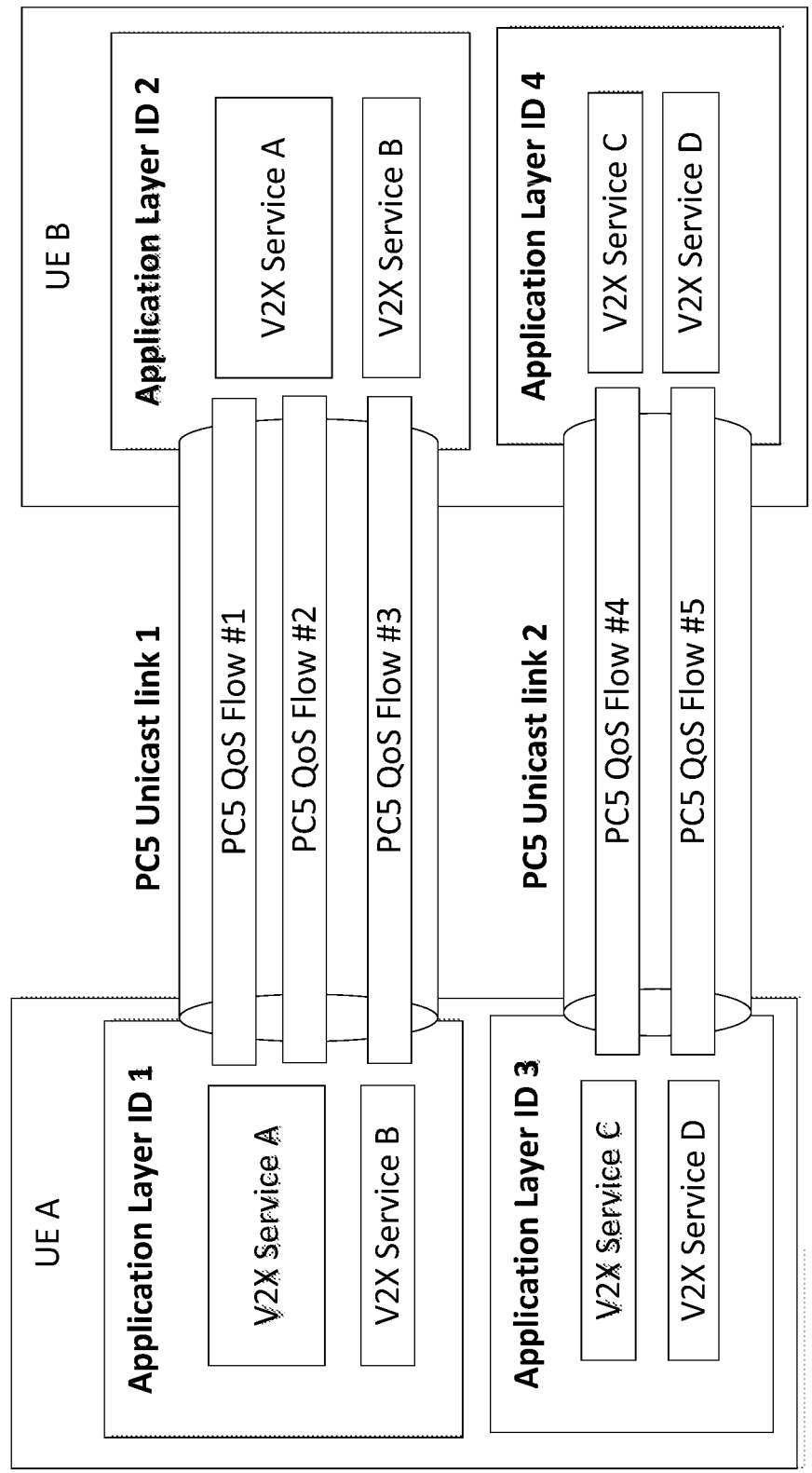
FIG. 5 is a reproduction of FIG. 5.2.1.4-1 of 3GPP TS 23.287 V16.0.0.

Unicast mode of communication is only supported over NR based PC5 reference point. FIG. 5.2.1.4-1 illustrates an example of PC5 unicast links.

FIG. 5.2.1.4-1 of 3GPP TS 23.287 V16.0.0, Entitled "Example of PC5 Unicast Links", is Reproduced as FIG. 5

The following principles apply when the V2X communication is carried over PC5 unicast link:
- A PC5 unicast link between two UEs allows V2X communication between one or more pairs of peer V2X services in these UEs. All V2X services in the UE using the same PC5 unicast link use the same Application Layer ID.
- NOTE 1: An Application Layer ID may change in time as described in clauses 5.6.1.1 and 6.3.3.2, due to privacy. This does not cause a re-establishment of a PC5 unicast link.
- One PC5 unicast link supports one or more V2X services (e.g. PSIDs or ITS-AIDs) if these V2X services are at least associated with the pair of peer Application Layer IDs for this PC5 unicast link. For example, as illustrated in FIG. 5.2.1.4-1, UE A and UE B have two PC5 unicast links, one between peer Application Layer ID 1/UE A and Application Layer ID 2/UE B and one between peer Application Layer ID 3/UE A and Application Layer ID 4/UE B.
- NOTE 2: A source UE is not required to know whether different target Application Layer IDs over different PC5 unicast links belong to the same target UE.
- A PC5 unicast link supports V2X communication using a single network layer protocol e.g. IP or non-IP.
- A PC5 unicast link supports per-flow QoS model as specified in clause 5.4.1.

When the Application layer in the UE initiates data transfer for a V2X service which requires unicast mode of communication over PC5 reference point:
- the UE shall reuse an existing PC5 unicast link if the pair of peer Application Layer IDs and the network layer protocol of this PC5 unicast link are identical to those required by the application layer in the UE for this V2X service, and modify the existing PC5 unicast link to add this V2X service as specified in clause 6.3.3.4; otherwise
- the UE shall trigger the establishment of a new PC5 unicast link as specified in clause 6.3.3.1.

After successful PC5 unicast link establishment, UE A and UE B use the same pair of Layer-2 IDs for subsequent PC5-S signalling message exchange and V2X service data transmission as specified in clause 5.6.1.4. The V2X layer of the transmitting UE indicates to the AS layer whether a transmission is for a PC5-S signalling message (i.e. Direct Communication Request/Accept, Link Identifier Update Request/Response, Disconnect Request/Response, Link Modification Request/Accept) or V2X service data.

For every PC5 unicast link, a UE self-assigns a distinct PC5 Link Identifier that uniquely identifies the PC5 unicast link in the UE for the lifetime of the PC5 unicast link. Each PC5 unicast link is associated with a Unicast Link Profile which includes:
- service type(s) (e.g. PSID or ITS-AID), Application Layer ID and Layer-2 ID of UE A; and
- Application Layer ID and Layer-2 ID of UE B; and
- network layer protocol used on the PC5 unicast link; and
- for each V2X service, a set of PC5 QoS Flow Identifier(s) (PFI(s)). Each PFI is associated with QoS parameters (i.e. PQI and optionally Range).

For privacy reason, the Application Layer IDs and Layer-2 IDs may change as described in clauses 5.6.1.1 and 6.3.3.2 during the lifetime of the PC5 unicast link and, if so, shall be updated in the Unicast Link Profile accordingly. The UE uses PC5 Link Identifier to indicate the PC5 unicast link to V2X Application layer, therefore V2X Application layer identifies the corresponding PC5 unicast link even if there are more than one unicast link associated with one service type (e.g. the UE establishes multiple unicast links with multiple UEs for a same service type).

The Unicast Link Profile shall be updated accordingly after a Layer-2 link modification for an established PC5 unicast link as specified in clause 6.3.3.4.

5.6 Identifiers 5.6.1 Identifiers for V2X Communication Over PC5 Reference Point 5.6.1.1 General Each UE has one or more Layer-2 IDs for V2X communication over PC5 reference point, consisting of:
- Source Layer-2 ID(s); and
- Destination Layer-2 ID(s).

Source and destination Layer-2 IDs are included in layer-2 frames sent on the layer-2 link of the PC5 reference point identifying the layer-2 source and destination of these frames. Source Layer-2 IDs are always self-assigned by the UE originating the corresponding layer-2 frames.

The selection of the source and destination Layer-2 ID(s) by a UE depends on the communication mode of V2X communication over PC5 reference point for this layer-2 link, as described in clauses 5.6.1.2, 5.6.1.3, and 5.6.1.4. The source Layer-2 IDs may differ between different communication modes.

When IP-based V2X communication is supported, the UE configures a link local IPv6 address to be used as the source IP address, as defined in clause 4.5.3 of TS 23.303 [17]. The UE may use this IP address for V2X communication over PC5 reference point without sending Neighbour Solicitation and Neighbour Advertisement message for Duplicate Address Detection.

If the UE has an active V2X application that requires privacy support in the current Geographical Area, as identified by configuration described in clause 5.1.2.1, in order to ensure that a source UE (e.g. vehicle) cannot be tracked or identified by any other UEs (e.g. vehicles) beyond a certain short time-period required by the application, the source Layer-2 ID shall be changed over time and shall be randomized. For IP-based V2X communication over PC5 reference point, the source IP address shall also be changed overtime and shall be randomized. The change of the identifiers of a source UE must be synchronized across layers used for PC5, e.g. when the Application Layer ID changes, the source Layer-2 ID and the source IP address need to be changed.

5.6.1.2 Identifiers for Broadcast Mode V2X Communication Over PC5 Reference Point For broadcast mode of V2X communication over PC5 reference point, the UE is configured with the destination Layer-2 ID(s) to be used for V2X services. The destination Layer-2 ID for a V2X communication is selected based on the configuration as described in clause 5.1.2.1.

The UE self-selects a source Layer-2 ID. The UE may use different source Layer-2 IDs for different types of PC5 reference points, i.e. LTE based PC5 and NR based PC5.

5.6.1.4 Identifiers for unicast mode V2X communication over PC5 reference point

For unicast mode of V2X communication over PC5 reference point, the destination Layer-2 ID used depends on the communication peer, which is discovered during the establishment of the PC5 unicast link. The initial signalling for the establishment of the PC5 unicast link may use a default destination Layer-2 ID associated with the service type (e.g. PSID/ITS-AID) configured for PC5 unicast link establishment, as specified in clause 5.1.2.1. During the PC5 unicast link establishment procedure, Layer-2 IDs are exchanged, and should be used for future communication between the two UEs, as specified in clause 6.3.3.1.

The Application Layer ID is associated with one or more V2X applications within the UE. If UE has more than one Application Layer IDs, each Application Layer ID of the same UE may be seen as different UE's Application Layer ID from the peer UE's perspective.

The UE maintains a mapping between the Application Layer IDs and the source Layer-2 IDs used for the PC5 unicast links, as the V2X application layer does not use the Layer-2 IDs. This allows the change of source Layer-2 ID without interrupting the V2X applications.

When Application Layer IDs change, the source Layer-2 ID(s) of the PC5 unicast link(s) shall be changed if the link(s) was used for V2X communication with the changed Application Layer IDs.

A UE may establish multiple PC5 unicast links with a peer UE and use the same or different source Layer-2 IDs for these PC5 unicast links.

Editor's note: Further updates of the identifier description may be required based on RAN WG feedback.

6.3.3 Unicast Mode V2X Communication Over PC5 Reference Point 6.3.3.1 Layer-2 Link Establishment Over PC5 Reference Point To perform unicast mode of V2X communication over PC5 reference point, the UE is configured with the related information as described in clause 5.1.2.1.

Figure 6:
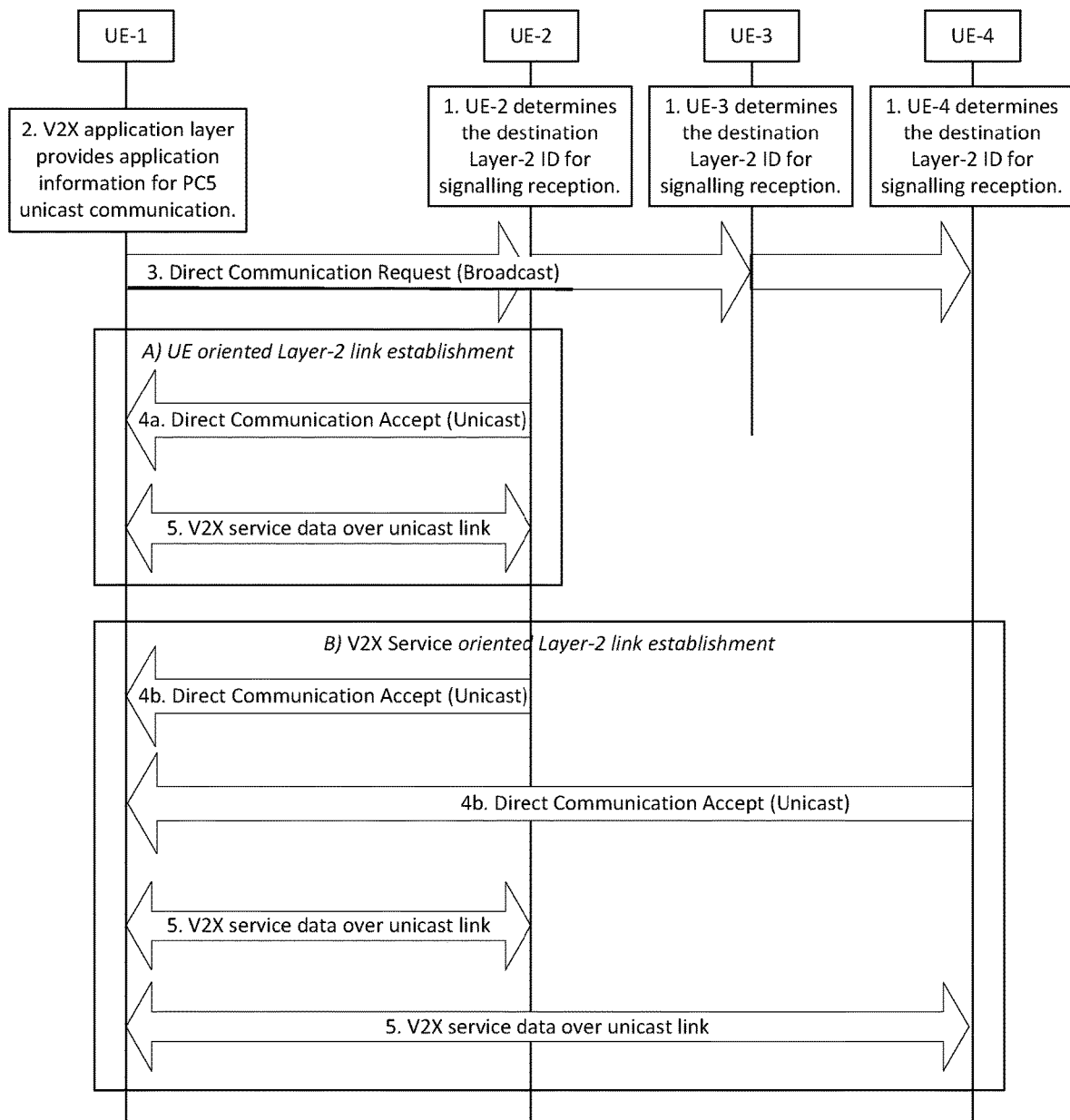
FIG. 6 is a reproduction of FIG. 6.3.3.1-1 of 3GPP TS 23.287 V16.0.0.

FIG. 6.3.3.1-1 shows the layer-2 link establishment procedure for unicast mode of V2X communication over PC5 reference point.

FIG. 6.3.3.1-1 of 3GPP TS 23.287 V16.0.0, Entitled "Layer-2 Link Establishment Procedure", is Reproduced as FIG. 6

1. The UE(s) determine the destination Layer-2 ID for signalling reception for PC5 unicast link establishment as specified in clause 5.6.1.4. The destination Layer-2 ID is configured with the UE(s) as specified in clause 5.1.2.1.
2. The V2X application layer in UE-1 provides application information for PC5 unicast communication. The application information includes the service type(s) (e.g. PSID or ITS-AID) of the V2X application and the initiating UE's Application Layer ID. The target UE's Application Layer ID may be included in the application information.
    The V2X application layer in UE-1 may provide V2X Application Requirements for this unicast communication. UE-1 determines the PC5 QoS parameters and PFI as specified in clause 5.4.1.4.
    If UE-1 decides to reuse the existing PC5 unicast link as specified in clause 5.2.1.4, the UE triggers Layer-2 link modification procedure as specified in clause 6.3.3.4.
3. UE-1 sends a Direct Communication Request message to initiate the unicast layer-2 link establishment procedure. The Direct Communication Request message includes:
    Source User Info: the initiating UE's Application Layer ID (i.e. UE-1's Application Layer ID).
    If the V2X application layer provided the target UE's Application Layer ID in step 2, the following information is included:
        Target User Info: the target UE's Application Layer ID (i.e. UE-2's Application Layer ID).
    V2X Service Info: the information about V2X Service (s) requesting Layer-2 link establishment (e.g. PSID (s) or ITS-AID(s)).
    Indication whether IP communication is used.
    IP Address Configuration: For IP communication, IP address configuration is required for this link and indicates one of the following values:
        "IPv6 Router" if IPv6 address allocation mechanism is supported by the initiating UE, i.e., acting as an IPv6 Router; or
        "IPv6 address allocation not supported" if IPv6 address allocation mechanism is not supported by the initiating UE.
    Link Local IPv6 Address: a link-local IPv6 address formed locally based on RFC 4862 [21] if UE-1 does not support the IPv6 IP address allocation mechanism, i.e. the IP Address Configuration indicates "IPv6 address allocation not supported".
    QoS Info: the information about PC5 QoS Flow(s). For each PC5 QoS Flow, the PFI and the corresponding PC5 QoS parameters (i.e. PQI and conditionally other parameters such as MFBR/GFBR, etc.).
    The source Layer-2 ID and destination Layer-2 ID used to send the Direct Communication Request message are determined as specified in clauses 5.6.1.1 and 5.6.1.4.
    UE-1 sends the Direct Communication Request message via PC5 broadcast using the source Layer-2 ID and the destination Layer-2 ID.
4. A Direct Communication Accept message is sent to UE-1 as below:
    4a. (UE oriented Layer-2 link establishment) If the Target User Info is included in the Direct Communication Request message, the target UE, i.e. UE-2 responds with a Direct Communication Accept message.
    4b. (V2X Service oriented Layer-2 link establishment) If the Target User Info is not included in the Direct Communication Request message, the UEs that are interested in using the announced V2X Service(s), so decide to establish Layer-2 link with UE-1 respond to the request by sending a Direct Communication Accept message (UE-2 and UE-4 in FIG. 6.3.3.1-1).
    The Direct Communication Accept message includes:
        Source User Info: Application Layer ID of the UE sending the Direct Communication Accept message.
        QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc.).
        IP Address Configuration: For IP communication, IP address configuration is required for this link and indicates one of the following values:

"IPv6 Router" if IPv6 address allocation mechanism is supported by the target UE, i.e., acting as an IPv6 Router; or "IPv6 address allocation not supported" if IPv6 address allocation mechanism is not supported by the target UE.

Link Local IPv6 Address: a link-local IPv6 address formed locally based on RFC 4862 [21] if the target UE does not support the IPv6 IP address allocation mechanism, i.e. the IP Address Configuration indicates "IPv6 address allocation not supported", and UE-1 included a link-local IPv6 address in the Direct Communication Request message. The target UE shall include a non-conflicting link-local IPv6 address.

If both UEs (i.e. the initiating UE and the target UE) selected to use link-local IPv6 address, they shall disable the duplicate address detection defined in RFC 4862 [21].

NOTE 1: When either the initiating UE or the target UE indicates the support of IPv6 router, corresponding address configuration procedure would be carried out after the establishment of the layer 2 link, and the link-local IPv6 addresses are ignored.

The source Layer-2 ID used to send the Direct Communication Accept message is determined as specified in clauses 5.6.1.1 and 5.6.1.4. The destination Layer-2 ID is set to the source Layer-2 ID of the received Direct Communication Request message.

Upon receiving the Direct Communication Accept message from peer UE, UE-1 obtains the peer UE's Layer-2 ID for future communication, for signalling and data traffic for this unicast link.

The V2X layer of the UE that established PC5 unicast link passes the PC5 Link Identifier assigned for the unicast link and PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

Editor's note: Steps for mutual authentication and security association establishment will be determined based on feedback from SA WG3.

5. V2X service data is transmitted over the established unicast link as below:

The PC5 Link Identifier and PFI are provided to the AS layer, together with the V2X service data.

UE-1 sends the V2X service data using the source Layer-2 ID (i.e. UE-1's Layer-2 ID for this unicast link) and the destination Layer-2 ID (i.e. the peer UE's Layer-2 ID for this unicast link).

NOTE 2: PC5 unicast link is bi-directional, therefore the peer UE of UE-1 can send the V2X service data to UE-1 over the unicast link with UE-1.

Editor's note: The parameters included in the Direct Communication Request/Accept messages can be updated depending on RAN WGs' decision on how the Direct Communication Request/Accept messages are sent by the AS layer (e.g. by using PC5-RRC signalling).

Editor's note: Additional parameters included in the Direct Communication Request/Accept messages (e.g. security related) are FFS.

Editor's note: Whether the unicast communication requires security protection at link layer will be determined based on feedback from SA WG3.

6.3.3.4 Layer-2 Link Modification for a Unicast Link

FIG. 6.3.3.4-1 shows the layer-2 link modification procedure for a unicast link. This procedure is used to:
  add new V2X service(s) to the existing PC5 unicast link.
  remove any V2X service(s) from the existing PC5 unicast link.
  modify any PC5 QoS Flow(s) in the existing PC5 unicast link.

Figure 7:
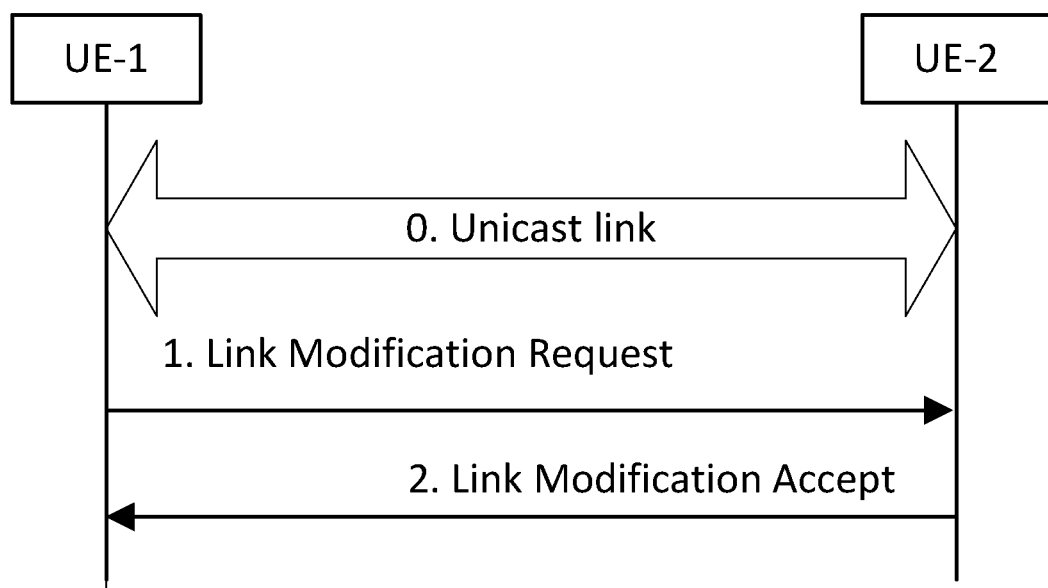
FIG. 7 is a reproduction of FIG. 7-1 of 3GPP TR 38.885 V16.0.0.

FIG. 6.3.3.4-1 of 3GPP TS 23.287 V16.0.0, Entitled "Layer-2 Link Modification Procedure", is Reproduced as FIG. 7

0. UE-1 and UE-2 have a unicast link established as described in clause 6.3.3.1.
1. The V2X application layer in UE-1 provides application information for PC5 unicast communication. The application information includes the service type(s) (e.g. PSID or ITS-AID) of the V2X application(s) and the initiating UE's Application Layer ID. The target UE's Application Layer ID may be included in the application information. If UE-1 decides to reuse the existing PC5 unicast link as specified in clause 5.2.1.4, so decides to modify the unicast link established with UE-2, UE-1 sends a Link Modification Request to UE-2.

The Link Modification Request message includes:
  a) To add new V2X service(s) to the existing PC5 unicast link:
    V2X Service Info: the information about V2X Service(s) to be added (e.g. PSID(s) or ITS-AID(s)).
    QoS Info: the information about PC5 QoS Flow(s) for each V2X Service to be added. For each PC5 QoS Flow, the PFI and the corresponding PC5 QoS parameters (i.e. PQI and conditionally other parameters such as MFBR/GFBR, etc.).
  b) To remove any V2X service(s) from the existing PC5 unicast link:
    V2X Service Info: the information about V2X Service(s) to be removed (e.g. PSID(s) or ITS-AID(s)).
  c) To modify any PC5 QoS Flow(s) in the existing PC5 unicast link:
    QoS Info: the information about PC5 QoS Flow(s) to be modified. For each PC5 QoS Flow, the PFI and the corresponding PC5 QoS parameters (i.e. PQI and conditionally other parameters such as MFBR/GFBR, etc.).
2. UE-2 responds with a Link Modification Accept message.

The Link Modification Accept message includes:
  For case a) and case c) described in step 1:
    QoS Info: the information about PC5 QoS Flow (s). For each PC5 QoS Flow, the PFI and the corresponding PC5 QoS parameters (i.e. PQI and conditionally other parameters such as MFBR/GFBR, etc.).

The V2X layer of each UE provides information about the unicast link modification to the AS layer. This enables the AS layer to update the context related to the modified unicast link.

3GPP S2-1910019 introduces the use of unicast L2 ID (Layer-2 Identity) for unicast link establishment into TS 23.287 v16.0.0 as follows:

Start of 1st Change 5.6.1.4 Identifiers for Unicast Mode V2X Communication Over PC5 Reference Point For unicast mode of V2X communication over PC5 reference point, the destination Layer-2 ID used depends on the communication peer. The Layer-2 ID of the communication peer, identified by the Application Layer ID, may be discovered during the establishment of the PC5 unicast link, or known to the UE via prior V2X communications, e.g. existing or prior unicast link to the same Application Layer ID, or obtained from application layer service announcements. The initial signalling for the establishment of the PC5 unicast link may use the known Layer-2 ID of the communication peer, or a default destination Layer-2 ID associated with the service type (e.g. PSID/ITS-AID) configured for PC5 unicast link establishment, as specified in clause 5.1.2.1. During the PC5 unicast link establishment procedure, Layer-2 IDs are exchanged, and should be used for future communication between the two UEs, as specified in clause 6.3.3.1.

The Application Layer ID is associated with one or more V2X applications within the UE. If UE has more than one Application Layer IDs, each Application Layer ID of the same UE may be seen as different UE's Application Layer ID from the peer UE's perspective.

The UE maintains a mapping between the Application Layer IDs and the source Layer-2 IDs used for the PC5 unicast links, as the V2X application layer does not use the Layer-2 IDs. This allows the change of source Layer-2 ID without interrupting the V2X applications.

When Application Layer IDs change, the source Layer-2 ID(s) of the PC5 unicast link(s) shall be changed if the link(s) was used for V2X communication with the changed Application Layer IDs.

A UE may establish multiple PC5 unicast links with a peer UE and use the same or different source Layer-2 IDs for these PC5 unicast links.

Editor's note: Further updates of the identifier description may be required based on RAN WG feedback.

Start of 2nd Change 6.3.3.1 Layer-2 Link Establishment Over PC5 Reference Point

To perform unicast mode of V2X communication over PC5 reference point, the UE is configured with the related information as described in clause 5.1.2.1.

FIG. 6.3.3.1-1 shows the layer-2 link establishment procedure for unicast mode of V2X communication over PC5 reference point.

Figure 8:
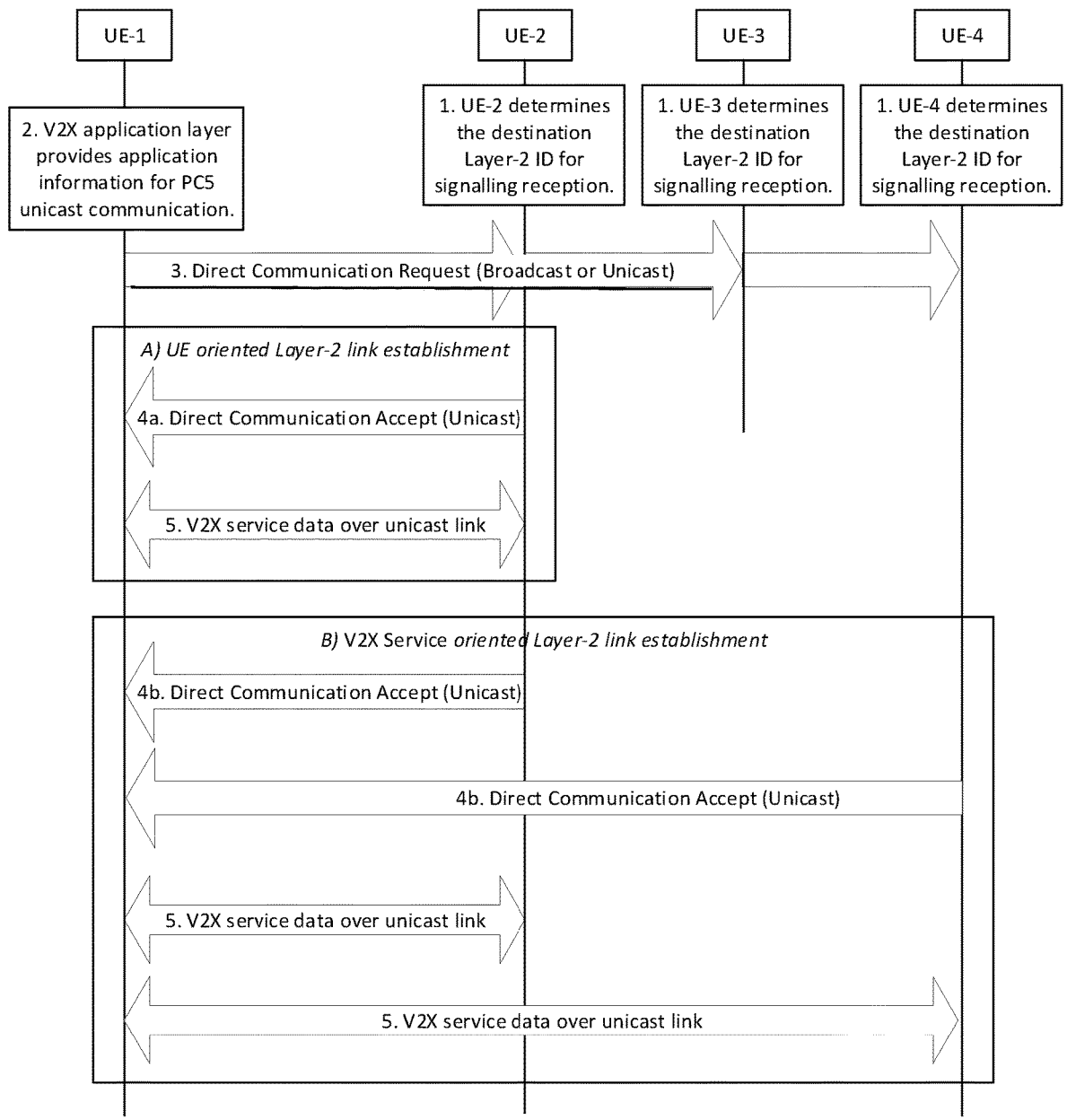
FIG. 8 is a reproduction of FIG. 6.3.3.3-1 provided in 3GPP S2-1910019.

FIG. 6.3.3.3-1 Provided in 3GPP S2-1910019, Entitled "Layer-2 Link Establishment Procedure", is Reproduced as FIG. 8

1. The UE(s) determine the destination Layer-2 ID for signalling reception for PC5 unicast link establishment as specified in clause 5.6.1.4. The destination Layer-2 ID is configured with the UE(s) as specified in clause 5.1.2.1.
2. The V2X application layer in UE-1 provides application information for PC5 unicast communication. The application information includes the service type(s) (e.g. PSID or ITS-AID) of the V2X application and the initiating UE's Application Layer ID. The target UE's Application Layer ID may be included in the application information.

The V2X application layer in UE-1 may provide V2X Application Requirements for this unicast communication. UE-1 determines the PC5 QoS parameters and PFI as specified in clause 5.4.1.4.

If UE-1 decides to reuse the existing PC5 unicast link as specified in clause 5.2.1.4, the UE triggers Layer-2 link modification procedure as specified in clause 6.3.3.4.

3. UE-1 sends a Direct Communication Request message to initiate the unicast layer-2 link establishment procedure. The Direct Communication Request message includes:

Source User Info: the initiating UE's Application Layer ID (i.e. UE-1's Application Layer ID).

If the V2X application layer provided the target UE's Application Layer ID in step 2, the following information is included:

Target User Info: the target UE's Application Layer ID (i.e. UE-2's Application Layer ID).

V2X Service Info: the information about V2X Service(s) requesting Layer-2 link establishment (e.g. PSID(s) or ITS-AID(s)).

Indication whether IP communication is used.

IP Address Configuration: For IP communication, IP address configuration is required for this link and indicates one of the following values:

"IPv6 Router" if IPv6 address allocation mechanism is supported by the initiating UE, i.e., acting as an IPv6 Router; or "IPv6 address allocation not supported" if IPv6 address allocation mechanism is not supported by the initiating UE.

Link Local IPv6 Address: a link-local IPv6 address formed locally based on RFC 4862 [21] if UE-1 does not support the IPv6 IP address allocation mechanism, i.e. the IP Address Configuration indicates "IPv6 address allocation not supported".

QoS Info: the information about PC5 QoS Flow(s). For each PC5 QoS Flow, the PFI and the corresponding PC5 QoS parameters (i.e. PQI and conditionally other parameters such as MFBR/GFBR, etc.).

The source Layer-2 ID and destination Layer-2 ID used to send the Direct Communication Request message are determined as specified in clauses 5.6.1.1 and 5.6.1.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.

4. A Direct Communication Accept message is sent to UE-1 as below:

4a. (UE oriented Layer-2 link establishment) If the Target User Info is included in the Direct Communication Request message, the target UE, i.e. UE-2 responds with a Direct Communication Accept message if the Application Layer ID for UE-2 matches.

4b. (V2X Service oriented Layer-2 link establishment) If the Target User Info is not included in the Direct Communication Request message, the UEs that are interested in using the announced V2X Service(s), so decide to establish Layer-2 link with UE-1 respond to the request by sending a Direct Communication Accept message (UE-2 and UE-4 in FIG. 6.3.3.1-1).

The Direct Communication Accept message includes:
  Source User Info: Application Layer ID of the UE sending the Direct Communication Accept message.
  QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc.).
  IP Address Configuration: For IP communication, IP address configuration is required for this link and indicates one of the following values:
    "IPv6 Router" if IPv6 address allocation mechanism is supported by the target UE, i.e., acting as an IPv6 Router; or
    "IPv6 address allocation not supported" if IPv6 address allocation mechanism is not supported by the target UE.
  Link Local IPv6 Address: a link-local IPv6 address formed locally based on RFC 4862 [21] if the target UE does not support the IPv6 IP address allocation mechanism, i.e. the IP Address Configuration indicates "IPv6 address allocation not supported", and UE-1 included a link-local IPv6 address in the Direct Communication Request message. The target UE shall include a non-conflicting link-local IPv6 address.
  If both UEs (i.e. the initiating UE and the target UE) selected to use link-local IPv6 address, they shall disable the duplicate address detection defined in RFC 4862 [21].
NOTE 1: When either the initiating UE or the target UE indicates the support of IPv6 router, corresponding address configuration procedure would be carried out after the establishment of the layer 2 link, and the link-local IPv6 addresses are ignored.
  The source Layer-2 ID used to send the Direct Communication Accept message is determined as specified in clauses 5.6.1.1 and 5.6.1.4. The destination Layer-2 ID is set to the source Layer-2 ID of the received Direct Communication Request message.
  Upon receiving the Direct Communication Accept message from peer UE, UE-1 obtains the peer UE's Layer-2 ID for future communication, for signalling and data traffic for this unicast link.
  The V2X layer of the UE that established PC5 unicast link passes the PC5 Link Identifier assigned for the unicast link and PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.
  Editor's note: Steps for mutual authentication and security association establishment will be determined based on feedback from SA WG3.
5. V2X service data is transmitted over the established unicast link as below:
  The PC5 Link Identifier and PFI are provided to the AS layer, together with the V2X service data.
  UE-1 sends the V2X service data using the source Layer-2 ID (i.e. UE-1's Layer-2 ID for this unicast link) and the destination Layer-2 ID (i.e. the peer UE's Layer-2 ID for this unicast link).
NOTE 2: PC5 unicast link is bi-directional, therefore the peer UE of UE-1 can send the V2X service data to UE-1 over the unicast link with UE-1.
  Editor's note: The parameters included in the Direct Communication Request/Accept messages can be updated depending on RAN WGs' decision on how the Direct Communication Request/Accept messages are sent by the AS layer (e.g. by using PC5-RRC signalling).
  Editor's note: Additional parameters included in the Direct Communication Request/Accept messages (e.g. security related) are FFS.
  Editor's note: Whether the unicast communication requires security protection at link layer will be determined based on feedback from SA WG3.

End of Changes

In 3GPP TS 33.303, security for direct link signaling and direct link user plane traffic in one-to-one sidelink communication (i.e. unicast mode communication) is specified as follows:

6.5 Security for One-to-One ProSe Direct Communication 6.5.2 Security Requirements The following are the security requirements for ProSe Direct One-to-one Communication:
  A ProSe-enabled UE shall use different security contexts for ProSe one-to-one communication with different ProSe-enabled UEs.
  Direct link signalling ciphering shall be supported and may be used. Direct link signalling ciphering is a configuration option.
  Direct link user plane ciphering shall be supported and may be used.
  Direct link signalling integrity protection and replay protection shall be supported and used.
  Direct link user plane packets between UEs shall not be integrity protected.
  Establishment of the security between the UEs shall be protected from man-in-the-middle attacks.
  The system should support mutual authentication of public safety UEs out of network coverage.
  Compromise of a single UE should not affect the security of the others.
  Authentication credentials should be securely stored in UE.

6.5.3 Overview of One-to-One ProSe Direct Communication 6.5.3.1 Description of Different Layers of Keys and their Identities ProSe Direct One-to-one communication uses 4 different layers of keys. These are the following:
  Long term key: This is the key that is provisioned (see the individual cases in 6.5.4 for more information on the provisioning) into the UE and is the root of the security for one-to-one communications. It may be a symmetric key or public/private key pair depending on the particular use case. Authentication signalling (denoted as "Direct Authentication and Key Establishment"—see subclause 6.5.4) is exchanged between the UEs and possibly some entities in the network, for example in the ProSe UE-to-network relay case to derive the $K_D$. The long term key is identified by the Long term ID.
  $K_D$: This is a 256-bit root key that is shared between the two entities communicating using ProSe Direct one-toone communications. It may be refreshed by re-running the authentication signalling using the Long term key. In order to generate a $K_{D\text{-}sess}$ (the next layer of keys), nonces are exchanged between the communicating entities. $K_D$ may be kept even when the UEs have no active one-to-one communication session between them. The $K_D$ ID is used to identify $K_D$.

$K_{D\text{-}sess}$: This is the 256-bit key that is the root of the actual security context that is being used (or at least in the process of being established) to protect the transfer of data between the UEs. During a communication between the UEs, the $K_{D\text{-}sess}$ may be refreshed by running the rekeying procedure (see subclause 6.X.5.3). The actual keys (see next bullet) that are used in the confidentiality and integrity algorithms are derived directly from $K_{D\text{-}sess}$. The 16 bit $K_{D\text{-}sess}$ ID identifies the $K_{D\text{-}sess}$.

A $K_{D\text{-}sess}$ ID with a zero value indicates no security is used and hence the UEs shall not assign an all zero value of $K_{D\text{-}sess}$ ID when creating a security context.

PEK and PIK: The ProSe Encryption Key (PEK) and ProSe Integrity Key (PIK) are used in the chosen confidentiality and integrity algorithms respectively. They are derived from $K_{D\text{-}sess}$ and are refreshed automatically every time $K_{D\text{-}sess}$ is changed.

6.5.5.2 Security Establishment During Connection Set-Up
The subclause describes how security is established during connection set-up. The signalling flow is shown in FIG. 6.5.5.2-1.

Figure 9:
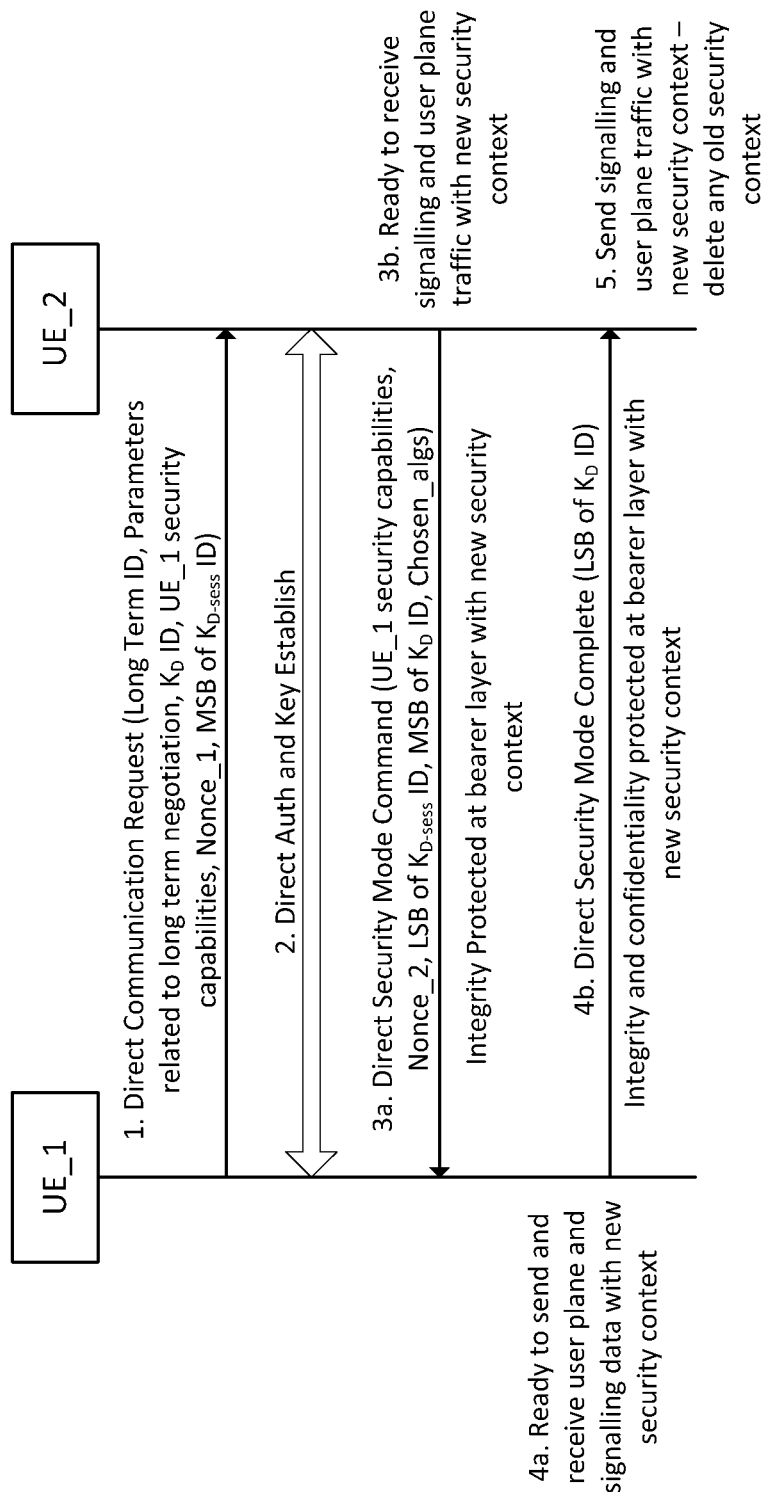
FIG. 9 is a reproduction of FIG. 6.5.5.2-1 of 3GPP TS 33.303 V15.0.0.

FIG. 6.5.5.2-1 of 3GPP TS 33.303 V15.0.0, Entitled "Security Establishment at Connection Set-Up", is Reproduced as FIG. 9

1. UE_1 has sent a Direct Communication Request to UE_2. This message shall include Nonce_1 (for session key generation), UE_1 security capabilities (the list of algorithms that UE_1 will accept for this connection) and the most significant 8-bits of the $K_{D\text{-}sess\_ID}$. These bits shall be chosen such that UE_1 will be able to locally identify a security context that is created by this procedure. The message may also include a $K_D$ ID if the UE_1 has an existing $K_D$ with the UE that it trying to communicate with. The absence of the $K_D$ ID parameter indicates that UE_1 does not have a $K_D$ for UE_2. The message shall also contain the necessary information to establish a $K_D$ from the relevant long terms keys held on the UE (see subclause 6.X.4). Long term ID is the info needed by the UE_2 in order to retrieve the right Long term Key.
2. UE_2 may initiate a Direct Auth and Key Establish procedure with UE_1. This is mandatory if the UE_2 does not have the $K_D$ and $K_D$ ID pair indicated in step 1, and signalling is needed to establish the keys for the particular use case.
3. UE_2 sends the Direct Security Mode Command to UE_1. It shall include the most significant bits of $K_D$ ID if a fresh $K_D$ is generated, Nonce_2 to allow a session key to be calculated and the Chosen_algs parameter to indicate which security algorithms the UEs will use to protect the data. The included bits of $K_D$ ID shall uniquely identify the $K_D$ at UE_2. UE_2 shall also return the UE_1 security capabilities to provide protection against bidding down attacks. UE_2 also includes the least significant 8-bits of $K_{D\text{-}sess}$ ID in the messages. This bits are chosen so that UE_2 will be able to locally identify a security context that is created by this procedure. UE_2 calculates $K_{D\text{-}Sess}$ from $K_D$ and Nonce_1 and Nonce_2 (see Annex A.9) and then derives the confidentiality and integrity keys based on the chosen algorithms (Annex A.4).
UE_2 then integrity protects the Direct Security Mode Command before sending it to UE_1. UE_2 is then ready to receive both signalling and user plane traffic protected with the new security context. UE_2 shall form the $K_{D\text{-}Sess}$ ID from the most significant bits it received in message 1 and least significant bits it sent in message 3.
4. On receiving the Direct Security Mode Command, UE_1 shall calculate $K_{D\text{-}sess}$ and the confidentiality and integrity keys in the same way as UE_2. UE_1 shall check that the returned UE_1 security capabilities are the same as those it sent in step 1. UE_1 shall also check the integrity protection on the message. If both these checks pass, then UE_1 is ready to send and receive signalling and user traffic with the new security context. If most significant bits of $K_D$ ID were included in the Direct Security Mode Command, UE_1 shall generate the least significant bits of $K_D$ ID such that these bits uniquely identify $K_D$ at UE_1 and shall store the complete $K_D$ ID with $K_D$. UE_1 shall send an integrity protected and confidentiality protected (with the chosen algorithm which may be the null algorithm) Direct Security Mode Complete message to UE_2. UE_1 shall include the least significant bits of $K_D$ ID in this message. UE_1 shall form the $K_{D\text{-}sess}$ ID from the most significant bits it sent in message 1 and least significant bits it received in message 3.
5. UE_2 checks the integrity protection on the received Direct Security Mode Complete. If this passes, UE_2 is now ready to send user plane data and control signalling protected with the new security context. UE_2 deletes any old security context it has for UE_1. UE_2 shall form the $K_D$ ID from the most significant bits it sent in step 3 and least significant bits it received in the Direct Security Mode Complete. UE_2 shall store the complete $K_D$ ID with $K_D$.

3GPP TS 38.885 specifies QoS (Quality of Service) management for NR (New RAT/Radio) V2X unicast mode communication as follows:

7 QoS Management
QoS management is relevant to V2X in the context of its use in resource allocation, congestion control, in-device coexistence, power control and SLRB configuration. Physical layer parameters related to QoS management are the priority, latency, reliability and minimum required communication range (as defined by higher layers) of the traffic being delivered. Data rate requirements are also supported in the AS. A SL congestion metric and, at least in resource allocation mode 2, mechanisms for congestion control are needed. It is beneficial to report the SL congestion metric to gNB.
For SL unicast, groupcast and broadcast, QoS parameters of V2X packets are provided by upper layers to the AS. For SL unicast, the SLRBs are (pre-)configured based on the signalling flows and procedures shown in FIGS. 7-1 and 7-2. The per-flow QoS model described in [6] is assumed in upper layers.

Figure 10:
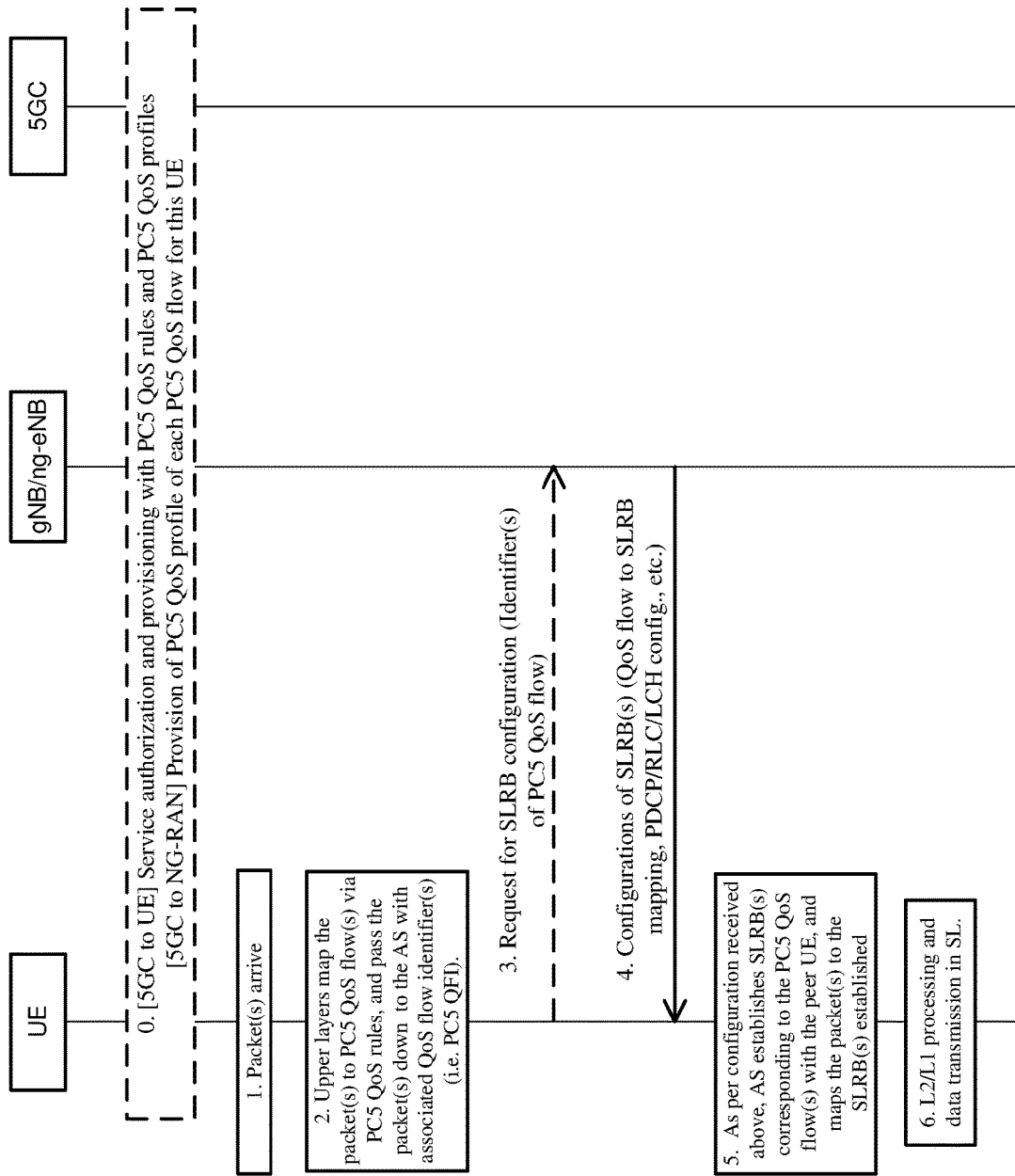
FIG. 10 is a reproduction of FIG. 7-1 of 3GPP TS 38.885 V16.0.0.

FIG. 7-1 of 3GPP TS 38.885 V16.0.0, Entitled "SLRB Configuration for SL Unicast (UE-Specific)", is Reproduced as FIG. 10

In Step 0 of FIG. 7-1, the PC5 QoS profile, i.e. a set of specific PC5 QoS parameters, and PC5 QoS rule for each PC5 QoS flow are provisioned to the UE in advance by service authorization and provisioning procedures as in [6]; similarly, PC5 QoS profile for each QoS flow is also provisioned to the gNB/ng-eNB in advance. Then, when packet(s) arrive, the UE can first derive the identifier of the associated PC5 QoS flow(s) (i.e. PC5 QFI) based on the PC5 QoS rules configured in Step 0, and may then report the derived PC5 QFI(s) to the gNB/ng-eNB in Step 3. The gNB/ng-eNB can derive the QoS profile(s) of these reported PC5 QFI(s) based on the provisioning from 5GC in Step 0, and may signal the configurations of the SLRB(s) associated with the PC5 QFI(s) UE reported via RRC dedicated signalling in Step 4. These SLRB configurations may include PC5 QoS flow to SLRB mapping, SDAP/PDCP/RLC/LCH configurations, etc. In Step 5, the UE in the AS establishes SLRB(s) associated with the PC5 QFI(s) of the packet(s) with the peer UE as per gNB/ng-eNB configuration, and maps available packet(s) to the SLRB(s) established. SL unicast transmission can then occur.

NOTE: How the PC5 QFI is defined is up to SA2 WG2.
[ . . . ]

Figure 11:
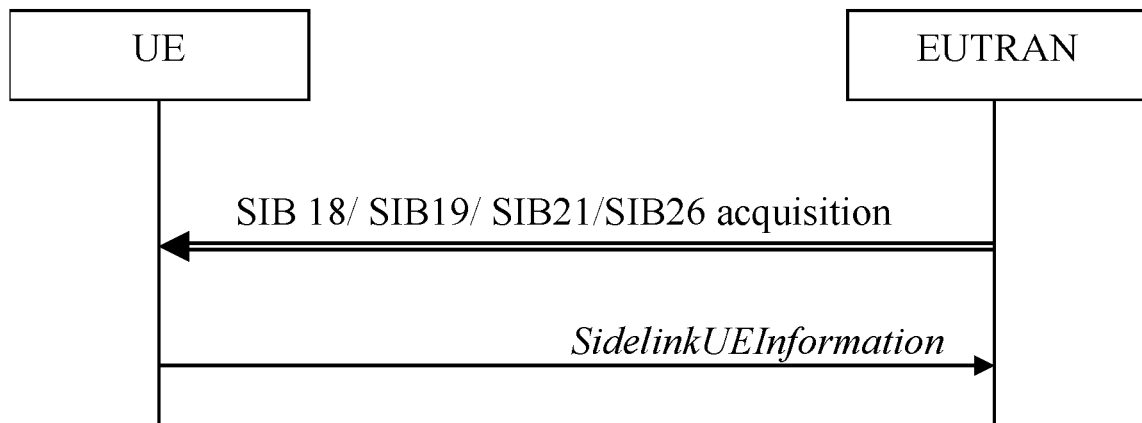
FIG. 11 is a reproduction of FIG. 5.10.2-1 of 3GPP TS 36.331 V15.3.0.

3GPP TS 36.331 specifies Sidelink UE (User Equipment) Information related to LTE V2X communication as follows:
5.10.2 Sidelink UE Information
5.10.2.1 General FIG. 5.10.2-1 of 3GPP TS 36.331 V15.3.0, Entitled "Sidelink UE Information", is Reproduced as FIG. 11

The purpose of this procedure is to inform E-UTRAN that the UE is interested or no longer interested to receive sidelink communication or discovery, to receive V2X sidelink communication, as well as to request assignment or release of transmission resources for sidelink communication or discovery announcements or V2X sidelink communication or sidelink discovery gaps, to report parameters related to sidelink discovery from system information of inter-frequency/PLMN cells and to report the synchronization reference used by the UE for V2X sidelink communication.

5.10.2.2 Initiation

A UE capable of sidelink communication or V2X sidelink communication or sidelink discovery that is in RRC_CONNECTED may initiate the procedure to indicate it is (interested in) receiving sidelink communication or V2X sidelink communication or sidelink discovery in several cases including upon successful connection establishment, upon change of interest, upon change to a PCell broadcasting SystemInformationBlockType18 or SystemInformationBlockType19 or SystemInformationBlockType21 including sl-V2X-ConfigCommon. A UE capable of sidelink communication or V2X sidelink communication or sidelink discovery may initiate the procedure to request assignment of dedicated resources for the concerned sidelink communication transmission or discovery announcements or V2X sidelink communication transmission or to request sidelink discovery gaps for sidelink discovery transmission or sidelink discovery reception and a UE capable of inter-frequency/PLMN sidelink discovery parameter reporting may initiate the procedure to report parameters related to sidelink discovery from system information of inter-frequency/PLMN cells.

NOTE 1: A UE in RRC_IDLE that is configured to transmit sidelink communication/V2X sidelink communication/sidelink discovery announcements, while SystemInformationBlockType18/SystemInformationBlockType19/SystemInformationBlockType21 including sl-V2X-ConfigCommon or SystemInformationBlockType26 does not include the resources for transmission (in normal conditions), initiates connection establishment in accordance with 5.3.3.1a.

Upon initiating the procedure, the UE shall:
[ . . . ]
1> if SystemInformationBlockType21 including sl-V2X-ConfigCommon is broadcast by the PCell:
   2> ensure having a valid version of SystemInformationBlockType21 and SystemInformationBlockType26, if broadcast, for the PCell;
   2> if configured by upper layers to receive V2X sidelink communication on a primary frequency or on one or more frequencies included in v2x-InterFreqInfoList, if included in SystemInformationBlockType21 or SystemInformationBlockType26 of the PCell:
      3> if the UE did not transmit a SidelinkUEInformation message since last entering RRC_CONNECTED state; or
      3> if since the last time the UE transmitted a SidelinkUEInformation message the UE connected to a PCell not broadcasting SystemInformationBlockType21 including sl-V2X-ConfigCommon; or
      3> if the last transmission of the SidelinkUEInformation message did not include v2x-CommRxInterestedFreqList; or if the frequency(ies) configured by upper layers to receive V2X sidelink communication on has changed since the last transmission of the SidelinkUEInformation message:
         4> initiate transmission of the SidelinkUEInformation message to indicate the V2X sidelink communication reception frequency(ies) of interest in accordance with 5.10.2.3;
   2> else:
      3> if the last transmission of the SidelinkUEInformation message included v2x-CommRxInterestedFreqList:
         4> initiate transmission of the SidelinkUEInformation message to indicate it is no longer interested in V2X sidelink communication reception in accordance with 5.10.2.3;
   2> if configured by upper layers to transmit V2X sidelink communication on a primary frequency or on one or more frequencies included in v2x-InterFregInfoList, if included in SystemInformationBlockType21 or SystemInformationBlockType26 of the PCell:
      3> if the UE did not transmit a SidelinkUEInformation message since last entering RRC_CONNECTED state; or
      3> if since the last time the UE transmitted a SidelinkUEInformation message the UE connected to a PCell not broadcasting SystemInformationBlockType21 including sl-V2X-ConfigCommon; or
      3> if the last transmission of the SidelinkUEInformation message did not include v2x-CommTxResourceReq; or if the information carried by the v2x-CommTxResourceReq has changed since the last transmission of the SidelinkUEInformation message:
         4> initiate transmission of the SidelinkUEInformation message to indicate the V2X sidelink communication transmission resources required by the UE in accordance with 5.10.2.3;
2> else:
3> if the last transmission of the SidelinkUEInformation message included v2x-CommTxResourceReq:
4> initiate transmission of the SidelinkUEInformation message to indicate it no longer requires V2X sidelink communication transmission resources in accordance with 5.10.2.3;

SidelinkUEInformation

The SidelinkUEInformation message is used for the indication of sidelink information to the eNB.

Signalling radio bearer: SRB1
RLC-SAP: AM
Logical channel: DCCH
Direction: UE to E-UTRAN SidelinkUEInformation Message

```
-- ASN1START
...
SidelinkUEInformation-v1430-IEs ::= SEQUENCE {
    v2x-CommRxInterestedFreqList-r14    SL-V2X-CommFreqList-r14 OPTIONAL,
    p2x-CommTxType-r14                  ENUMERATED {true }OPTIONAL,
    v2x-CommTxResourceReq-r14           SL-V2X-CommTxFreqList-r14 OPTIONAL,
    nonCriticalExtension                SidelinkUEInformation-v1530-IEs
                                        OPTIONAL
}
SidelinkUEInformation-v1530-IEs ::= SEQUENCE {
    reliabilityInfoListSL-r15           SL-ReliabilityList-r15 OPTIONAL,
    nonCriticalExtension                SEQUENCE { }OPTIONAL
}
...
SL-V2X-CommFreqList-r14 ::= SEQUENCE (SIZE (1..maxFreqV2X-r14)) OF INTEGER (0..maxFreqV2X-1-r14)
SL-V2X-CommTxFreqList-r14 ::= SEQUENCE (SIZE (1..maxFreqV2X-r14)) OF SL-V2X-CommTxResourceReq-r14
SL-V2X-CommTxResourceReq-r14 ::= SEQUENCE {
    carrierFreqCommTx-r14               INTEGER (0.. maxFreqV2X-1-r14) OPTIONAL,
    v2x-TypeTxSync-r14                  SL-TypeTxSync-r14 OPTIONAL,
    v2x-DestinationInfoList-r14         SL-DestinationInfoList-r12 OPTIONAL
}
-- ASN1STOP
```

SidelinkUEInformation field descriptions carrierFreqCommTx
Indicates the index of the frequency on which the UE is interested to transmit V2X sidelink communication. The value 1 corresponds to the frequency of first entry in v2x-InterFreqInfoList broadcast in SIB21, the value 2 corresponds to the frequency of second entry in v2x-InterFreqInfoList broadcast in SIB21 and so on. The value 0 corresponds the PCell's frequency.
carrierFreqCommTx
Indicates the index of the frequency on which the UE is interested to transmit V2X sidelink communication. The value 1 corresponds to the frequency of first entry in v2x-InterFreqInfoList broadcast in SIB21, the value 2 corresponds to the frequency of second entry in v2x-InterFreqInfoList broadcast in SIB21 and so on. The value 0 corresponds the PCell's frequency.
commRxInterestedFreq
Indicates the frequency on which the UE is interested to receive sidelink communication.
commTxResourceReq
Indicates the frequency on which the UE is interested to transmit non-relay related sidelink communication as well as the one-to-many sidelink communication transmission destination(s) for which the UE requests E-UTRAN to assign dedicated resources. NOTE 1.
reliabilityInfoListSL
Indicates the reliability(ies) (i.e., PPPRs [9]) associated with the reported traffic to be transmitted for V2X sidelink communication.
v2x-CommRxInterestedFreqList
Indicates the index(es) of the frequency(ies) on which the UE is interested to receive V2X sidelink communication. The value 1 corresponds to the frequency of first entry in v2x-InterFreqInfoList broadcast in SIB21, the value 2 corresponds to the frequency of second entry in v2x-InterFreqInfoList broadcast in SIB21 and so on. The value 0 corresponds the PCell's frequency.
v2x-DestinationInfoList
Indicates the destination(s) for V2X sidelink communication.
v2x-TypeTxSync
Indicates the synchronization reference used by the UE.

[ ... ]
SL-V2X-ConfigDedicated
The IE SL-V2X-ConfigDedicated specifies the dedicated configuration information for V2X sidelink communication.

SL-V2X-ConfigDedicated Information Element

```
-- ASN1START
SL-V2X-ConfigDedicated-r14 ::= SEQUENCE {
  commTxResources-r14 CHOICE {
    release NULL,
    setup CHOICE {
      scheduled-r14 SEQUENCE {
        sl-V-RNTI-r14 C-RNTI,
        mac-MainConfig-r14 MAC-MainConfigSL-r12,
        v2x-SchedulingPool-r14 SL-CommResourcePoolV2X-r14 OPTIONAL, -- Need ON
        mcs-r14 INTEGER (0..31) OPTIONAL, -- Need OR
        logicalChGroupInfoList-r14 LogicalChGroupInfoList-r13
      },
      ue-Selected-r14 SEQUENCE {
        -- Pool for normal usage
        v2x-CommTxPoolNormalDedicated-r14 SEQUENCE {
          poolToReleaseList-r14 SL-TxPoolToReleaseListV2X-r14 OPTIONAL, -- Need ON
          poolToAddModList-r14 SL-TxPoolToAddModListV2X-r14 OPTIONAL, -- Need ON
          v2x-CommTxPoolSensingConfig-r14 SL-CommTxPoolSensingConfig-r14
            OPTIONAL -- Need ON
        }
      }
    }
  } OPTIONAL, -- Need ON
  v2x-InterFreqInfoList-r14 SL-InterFreqInfoListV2X-r14 OPTIONAL, -- Need ON
  thresSL-TxPrioritization-r14 SL-Priority-r13 OPTIONAL, -- Need OR
  typeTxSync-r14 SL-TypeTxSync-r14 OPTIONAL, -- Need OR
  cbr-DedicatedTxConfigList-r14 SL-CBR-CommonTxConfigList-r14 OPTIONAL, -- Need OR
  ...,
  [[ commTxResources-v1530 CHOICE {
      release NULL,
      setup CHOICE {
        scheduled -v1530 SEQUENCE {
          logicalChGroupInfoList-v1530 LogicalChGroupInfoList-v1530 OPTIONAL, -- Need OR
          mcs-r15 INTEGER (0..31) OPTIONAL -- Need OR
        },
        ue-Selected-v1530 SEQUENCE {
          v2x-FreqSelectionConfigList-r15 SL-V2X-FreqSelectionConfigList-r15 OPTIONAL --Need OR
        }
      }
    } OPTIONAL, -- Need ON
    v2x-PacketDuplicationConfig-r15 SL-V2X-PacketDuplicationConfig-r15 OPTIONAL, -- Need OR
    syncFreqList-r15 SL-V2X-SyncFreqList-r15 OPTIONAL, -- Need OR
    slss-TxMultiFreq-r15 ENUMERATED {true }OPTIONAL -- Need OR
  ]]
}
LogicalChGroupInfoList-v1530 ::= SEQUENCE (SIZE (1..maxLCG-r13)) OF SL-ReliabilityList-r15
SL-TxPoolToAddModListV2X-r14 ::= SEQUENCE (SIZE (1.. maxSL-V2X-TxPool-r14)) OF SL-TxPoolToAddMod-r14
SL-TxPoolToAddMod-r14 ::= SEQUENCE {
  poolIdentity-r14 SL-V2X-TxPoolIdentity-r14,
  pool-r14 SL-CommResourcePoolV2X-r14
}
SL-TxPoolToReleaseListV2X-r14 ::= SEQUENCE (SIZE (1.. maxSL-V2X-TxPool-r14)) OF
SL-V2X-
TxPoolIdentity-r14
-- ASN1STOP
```

| SL-V2X-ConfigDedicated field descriptions |
|---|
| cbr-DedicatedTxConfigList<br>Indicates the dedicated list of CBR range division and the list of PSCCH TX configurations available to configure congestion control to the UE for V2X sidelink communication.<br>logicalChGroupInfoList<br>Indicates for each logical channel group the list of associated priorities and reliabilities, used as specified in TS 36.321 [6], in order of increasing logical channel group identity. If E-UTRAN includes logicalChGroupInfoList-v1530, it includes the same number of entries, and listed in the same order, as in logicalChGroupInfoList-r14, and a logical channel group identity of the same entry in logicalChGroupInfoList-r14 and in logicalChGroupInfo-v1530 is associated with both the priorties (as in logicalChGroupInfoList-r14) and reliablities (as in logicalChGroupInfoList-v-1520) of that entry. If logicalChGroupInfoList-v1530 is not included, this field indicates for each logical channel group the list of associated priorties.<br>mcs<br>Indicates the MCS as defined in TS 36.213 [23, 14.2.1]. If not configured, the selection of MCS is up to UE implementation. If included, mcs-r15 corresponds to both the MCS table in Table 8.6.1-1 in TS 36.213 [23] and the MCS table supporting 64QAM in Table 14.1.1-2 in TS 36.213 [23] used for transmission on PSSCH.<br>scheduled<br>Indicates the configuration for the case E-UTRAN schedules the transmission resources based on sidelink specific BSR from the UE.<br>sl-V-RNTI<br>Indicates the RNTI used for DCI dynamically scheduling sidelink resources for V2X sidelink communication.<br>thresSL-TxPrioritization<br>Indicates the threshold used to determine whether SL V2X transmission is prioritized over uplink transmission if they overlap in time (see TS 36.321 [6]). This value shall overwrite thresSL-TxPrioritization configured in SIB21 or SL-V2X-Preconfiguration if any.<br>type TxSync<br>Indicates the prioritized synchronization type (i.e. eNB or GNSS) for performing V2X sidelink communication on PCell.<br>ue-Selected<br>Indicates the configuration for the case the UE selects the transmission resources from a pool of resources configured by E-UTRAN.<br>v2x-InterFreqInfoList<br>Indicates synchronization and resource allocation configurations of other carrier frequencies than the serving carrier frequency for V2X sidelink communication. For inter-carrier scheduled resource allocation, CIF = 1 in DCI-5A corresponds to the first entry in this frequency list, CIF = 2 corresponds to the second entry, and so on (see TS 36.213 [23]). CIF = 0 in DCI-5A corresponds to the frequency where the DCI is received.<br>v2x-SchedulingPool<br>Indicates a pool of resources when E-UTRAN schedules Tx resources for V2X sidelink communications. |

A running CR to TS 38.331 for 5G V2X with NR Sidelink circulated on Nov. 13, 2019 (as captured in the 3GPP email discussion [107bis #91][V2X] 38.331 running CR (Huawei)) introduces a new Sidelink UE Information for NR V2X (i.e. SidelinkUEInformationNR) as follows:

5.X.3 Sidelink UE Information for NR Sidelink Communication

5.X.3.1 General

Figure 12:
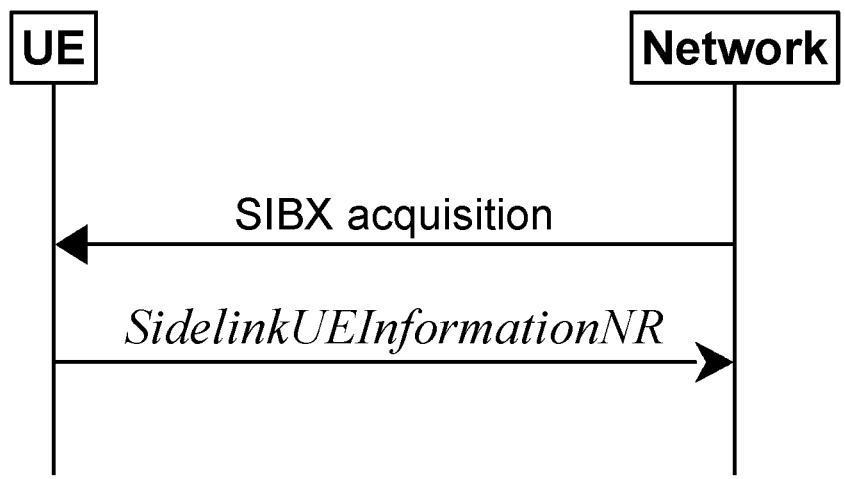
FIG. 12 is a reproduction of FIG. 5.X.3.1-1 provided in the 3GPP email discussion [107bis #91][V2X] 38.331 running CR (Huawei).

FIG. 5.X.3.1-1 of the 3GPP Email Discussion [107Bis #91][V2X] 38.331 Running CR (Huawei), Entitled "Sidelink UE Information for NR Sidelink Communication", is Reproduced as FIG. 12

The purpose of this procedure is to inform the network that the UE is interested or no longer interested to receive NR sidelink communication, as well as to request assignment or release of transmission resource for NR sidelink communication and to report parameters related to NR sidelink communication.

5.x.3.2 Initiation

A UE capable of NR sidelink communication that is in RRC_CONNECTED may initiate the procedure to indicate it is (interested in) receiving NR sidelink communication in several cases including upon successful connection establishment or resuming, upon change of interest, upon change to a PCell broadcasting SIBX including sl-ConfigCommonNR. A UE capable of NR sidelink communication may initiate the procedure to request assignment of dedicated resources for NR sidelink communication transmission. Upon initiating this procedure, the UE shall:

1> if SIBX including sl-ConfigCommonNR is broadcast by the PCell:

2> ensure having a valid version of SIBX for the PCell;

2> if configured by upper layers to receive NR sidelink communication on the frequency included in sl-FreqInfoList in SIBX of the PCell:

3> if the UE did not transmit a SidelinkUEInformationNR message since last entering RRC_CONNECTED state; or 3> if since the last time the UE transmitted a SidelinkUEInformationNR message the UE connected to a PCell not broadcasting SIBX including sl-ConfigCommonNR; or 3> if the last transmission of the SidelinkUEInformationNR message did not include sl-RxInterestedFreqList; or if the frequency configured by upper layers to receive NR sidelink communication on has changed since the last transmission of the SidelinkUEInformationNR message:

4> initiate transmission of the SidelinkUEInformationNR message to indicate the NR sidelink communication reception frequency of interest in accordance with 5.x.3.3;

2> else:

3> if the last transmission of the SidelinkUEInformationNR message included sl-RxInterestedFreqList:

4> initiate transmission of the SidelinkUEInformationNR message to indicate it is no longer interested in NR sidelink communication reception in accordance with 5.x.3.3;

2> if configured by upper layers to transmit NR sidelink communication on the frequency included in sl-FreqInfoList in SIBX of the PCell:
   3> if the UE did not transmit a SidelinkUEInformationNR message since last entering RRC_CONNECTED state; or
   3> if since the last time the UE transmitted a SidelinkUEInformationNR message the UE connected to a PCell not broadcasting SIBX including sl-ConfigCommonNR; or
   3> if the last transmission of the SidelinkUEInformationNR message did not include sl-TxResourceReqList; or if the information carried by the sl-TxResourceReqList has changed since the last transmission of the SidelinkUEInformationNR message:
     4> initiate transmission of the SidelinkUEInformationNR message to indicate the NR sidelink communication transmission resources required by the UE in accordance with 5.X.3.3;
2> else:
   3> if the last transmission of the SidelinkUEInformationNR message included sl-TxResourceReqList:
     4> initiate transmission of the SidelinkUEInformationNR message to indicate it no longer requires NR sidelink communication transmission resources in accordance with 5.X.3.3.

5.x.3.3 Actions Related to Transmission of SidelinkUEInformationNR Message

The UE shall set the contents of the SidelinkUEInformationNR message as follows:
1> if the UE initiates the procedure to indicate it is (no more) interested to receive NR sidelink communication or to request (configuration/release) of NR sidelink communication transmission resources (i.e. UE includes all concerned information, irrespective of what triggered the procedure):
   2> if SIBX including sl-ConfigCommonNR is broadcast by the PCell:
     3> if configured by upper layers to receive NR sidelink communication:
        4> include sl-RxInterestedFreqList and set it to the frequency for NR sidelink communication reception;
     3> if configured by upper layers to transmit NR sidelink communication:
        4> include sl-TxResourceReqList and set its fields as follows for each destination for which it requests network to assign NR sidelink communication resource:
           5> set sl-DestinationIdentity to the destination identity configured by upper layer for NR sidelink communication transmission;
           5> set sl-CastType to the cast type of the associated destination identity configured by the upper layer for the NR sidelink communication transmission;
           5> set sl-QoS-InfoList to include QoS profile(s) of the sidelink QoS flow(s) of the associated destination configured by the upper layer for the NR sidelink communication transmission;
           5> set sl-InterestedFreqList to indicate the frequency for NR sidelink communication transmission;
           5> set sl-TypeTxSyncList to the current synchronization reference type used on the associated sl-InterestedFreqList for NR sidelink communication transmission.
1> The UE shall submit the SidelinkUEInformationNR message to lower layers for transmission.

Editor's Notes: FFS on how to handle the RLF case with or without failure indication.

[ . . . ]

SidelinkUEInformationNR

The SidelinkUEInformationNR message is used for the indication of NR sidelink UE information to the network.

Signalling radio bearer: SRB1
RLC-SAP: AM
Logical channel: DCCH
Direction: UE to Network SidelinkUEInformationNR Message

```
-- ASN1START
-- TAG-SIDELINKUEINFORMATIONNR-START
SidelinkUEInformationNR-r16::= SEQUENCE {
    criticalExtensions CHOICE {
        sidelinkUEInformationNR-r16 SidelinkUEInformationNR-r16-IEs,
        criticalExtensionsFuture SEQUENCE {}
    }
}
SidelinkUEInformationNR-r16-IEs::= SEQUENCE {
    sl-RxInterestedFreqList-r16 SL-InterestedFreqList-r16 OPTIONAL,
    sl-TxResourceRedList-r16 SL-TxResourceReqList-r16 OPTIONAL,
    lateNonCriticalExtension OCTET STRING OPTIONAL,
    nonCriticalExtension SEQUENCE { } OPTIONAL
}
SL-TxResourceReqList-r16 ::= SEQUENCE (SIZE (1..maxNrofSL-Dest-r16)) OF SL-TxResourceReq-r16
SL-TxResourceReq-r16::= SEQUENCE {
    sl-DestinationIdentity-r16 SL-DestinationIdentity-r16,
    sl-CastType-r16 ENUMERATED {broadcast, groupcast, unicast, sparel},
    sl-QoS-InfoList-r16 SEQUENCE (SIZE (1..maxNrofSL-QFIsPerDest-r16)) OF SL-QoS-Info-r16,
    sl-TypeTxSyncList-r16 SEQUENCE (SIZE (1..maxNrofFreqSL-r16)) OF SL-TypeTxSync-r16,
    sl-TxInterestedFreqList-r16 SEQUENCE (SIZE (1..maxNrofFreqSL-r16)) OF INTEGER (1..maxNrofFreqSL-r16)
}
```

```
-- Editor's Notes: The use and structure of sl-TypeTxSyncList and sl-TxInterestedFreqList
are
FFS.
SL-QoS-Info-r16 ::= SEQUENCE {
    sl-QoS-FlowIdentity-r16 SL-QoS-FlowIdentity-r16,
    sl-QoS-Profile-r16 SL-QoS-Profile-r16
}
-- TAG-SIDELINKUEINFORMATIONNR-STOP
-- ASN1STOP
```

| SidelinkUEinformationNR field descriptions |
| --- |
| sl-RxInterestedFreqList
Indicates the index of frequency on which the UE is interested to receive NR sidelink communication. The value 1 corresponds to the frequency of first entry in sl-FreqInfoList broadcast in SIBX, the value 2 corresponds to the frequency of second entry in sl-FreqInfoList broadcast in SIBX and soon. In this release, only value 1 can be included in the interested frequency list.
sl-TxResourceReq
Paramters to request the transmisison resouces for NR sidelink communication to the network in the Sidelink UE Information report. |

| SL-TxResourceReq field descriptions |
| --- |
| sl-CastType
Indicates the case type for the correponding destination for which to request the resource.
sl-DestinationIdentity
Indicates the destination for which to request the resource.
sl-QoS-InfoList
Includes the QoS profile of the sidelink QoS flow as specified in TS 23.287 [xx]
sl-QoS-FlowIdentity
This identity uniquely identifies one sidelink QoS flow in the scope of UE, which is unique for different destination and cast type.
sl-TxInterestedFreqList
Each entry of this field indicates the index of frequency on which the UE is interested to transmit NR sidelink communication. The value 1 corresponds to the frequency of first entry in sl-FreqInfoList broadcast in SIBX, the value 2 corresponds to the frequency of second entry in sl-FreqInfoList broadcast in SIBX and soon. In this release, only value 1 can be included in the interested frequency list. In this relase, only one entry can be included in the list.
sl-TypeTxSyncList
A list of synchronization reference used by the UE. The UE shall include the same number of entries, listed in the same order, as in sl-TxInterestedFreqList, i.e. one for each carrier freqeuncy included in sl-TxInterestedFreqList. |

3GPP R2-1914138 captures RAN2 #107bis agreements
on PC5-S and PC5-RRC messages as follows:

1: The Sidelink Control Channel (SCCH) is used to carry PC5-S signaling.
2: The SL-SRB carrying PC5-S signaling is separated from the SL-SRB carrying PC5-RRC messages.
3: PC5-S message is not encapsulated into PC5-RRC message in NR Sidelink.
4: Different SCCHs carrying PC5-S message and PC5-RRC message respectively can be multiplexed into one MAC PDU in NR Sidelink for the same destination, if needed, in the same way with multiplexing of different STCHs, i.e. based on LCID.
5: SCCH and STCH can be multiplexed into one MAC PDU in NR Sidelink for the same destination, if needed, in the same way with multiplexing of STCHs, i.e. based on LCID.
6: PC5-S is located on top of PDCP/RLC/MAC/PHY.
7: The logical channel priority of SCCH carrying a PC5-RRC message is specified as a fixed value in 38.331.
8: The logical channel priority of SCCH carrying a PC5-S signaling is specified as a fixed value in 38.331.
9: A specified configuration is used for SCCH and specified in 38.331.

The running CR to TS 38.331 for 5G V2X with NR Sidelink (as captured in the 3GPP email discussion [107bis #91][V2X] 38.331 running CR (Huawei)) also introduces SCCH configurations for PC5-RRC and PC5-S messages as follows:

9.1.1.X SCCH Configuration

Parameters that are specified for unicast of NR sidelink communication, which is used for the sidelink signalling radio bearer of PC5-RRC message.

| Name | Value | Semantics description | Ver |
|---|---|---|---|
| PDCP configuration | | | |
| >t-Reordering | Undefined | Selected by the receiving UE, up to UE implementation | |
| >pdcp-SN-Size | 12(FFS) | | |
| RLC configuration | | | |
| >sn-FieldLength | 12 | | |
| >t-Reassembly | Undefined | Selected by the receiving UE, up to Up to UE implementation | |
| >logicalChannelIdentity | 1 | | |
| MAC configuration | | | |
| >priority | 1 | | |
| >prioritisedBitRate | infinity | | |
| >logicalChannelGroup | 0 | | |

Parameters that are specified for unicast of NR sidelink communication, which is used for the sidelink signalling radio bearer of PC5-S message.

| Name | Value | Semantics description | Ver |
|---|---|---|---|
| PDCP configuration | | | |
| >t-Reordering | Undefined | Selected by the receiving UE, up to UE implementation | |
| >pdcp-SN-Size | 12 | | |
| RLC configuration | | | |
| >sn-FieldLength | 12 | | |
| >t-Reassembly | Undefined | Selected by the receiving UE, up to Up to UE implementation | |
| >logicalChannelIdentity | 0 | | |
| MAC configuration | | | |
| >priority | 1 | | |
| >prioritisedBitRate | infinity | | |
| >logicalChannelGroup | 0 | | |

3GPP TS 23.287 and S2-1910019 specify a layer-2 link establishment procedure for unicast mode of V2X communication over PC5 reference point in Section 6.3.3.1. For example, the initiating UE (e.g. UE1) transmits a Direct Communication Request message and receives a Direct Communication Accept message from other UE(s). According to Section 5.6.1.4 of 3GPP S2-1910019, the initial signalling for the establishment of the PC5 unicast link may use the known Layer-2 ID of the communication peer, or a default destination Layer-2 ID for initial signalling to establish unicast connection for a V2X service or a V2X application which offers the V2X service (e.g. PSIDs or ITS-AIDs). The Layer-2 ID of the communication peer may be known to the UE via prior V2X communications, e.g. existing or prior unicast link to the same Application Layer ID, or obtained from application layer service announcements.

In the Direct Communication Request message, UE2's application layer ID and UE1's application layer ID are included so that UE2 can determine if to respond to the Direct Communication Request message. If UE2 determines to respond to the Direct Communication Request message, UE2 may initialize the procedure used to establish security context. A security configuration procedure used to establish security context during sidelink connection setup (or unicast link establishment) was specified in 3GPP TS 33.303.

For example, UE1 transmits a Direct Communication Request to UE2. In the Direct Communication Request, some parameters used to establish security context could be included. Upon reception of the Direct Communication Request, UE2 may initiate a Direct Auth and Key Establish procedure with UE1. And then, UE2 transmits a Direct Security Mode Command to UE1, and UE1 responds to UE2 with a Direct Security Mode Complete. In addition, if the Direct Security Mode Complete is received successfully, UE2 may transmit a Direct Communication Accept to UE1. In case security is not needed for a unicast link, the security configuration procedure can be omitted and UE2 may reply the Direct Communication Accept to UE1 directly.

When the Direct Communication Request message is transmitted, the source Layer-2 ID is set to Layer-2 ID of the initiating UE and the destination Layer-2 ID is set to the known Layer-2 ID of UE2 or the default destination Layer-2 ID associated with the service type. Therefore, UE2 may start to exchange signalling in the security establishment procedure based on the L2ID of UE1 and a L2ID of UE2 specifically assigned for the new unicast link after receiving the Direct Communication Request message. Since the L2ID of UE2 is assigned by UE2 specifically for the new unicast link and thus it may be different from the known Layer-2 ID of UE2 used by UE1 for transmitting the Direct Communication Request message.

Figure 13:
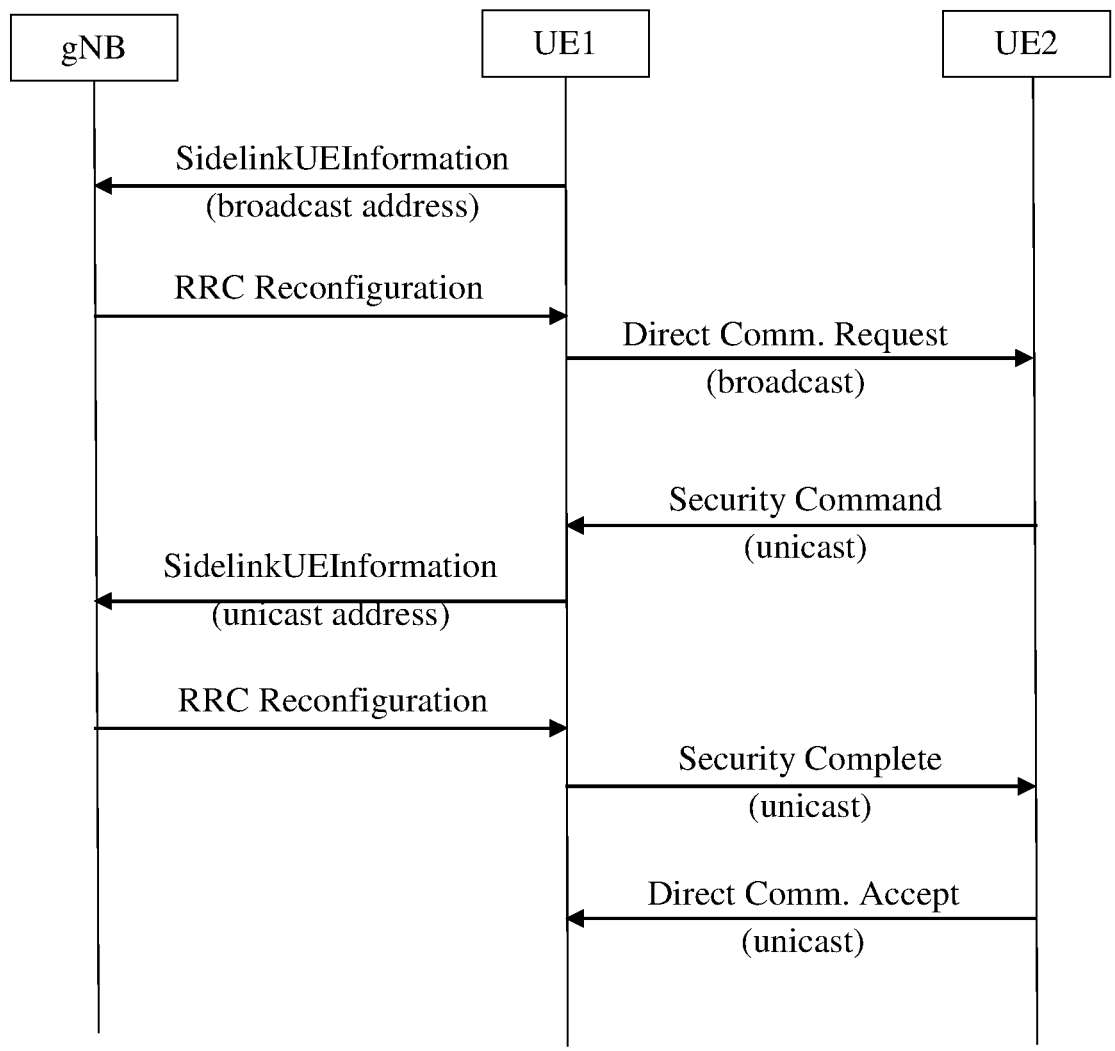
FIG. 13 is a diagram according to one exemplary embodiment.

According to the 3GPP email discussion [107bis #91] [V2X] 38.331 running CR (Huawei), a UE in RRC_CONNECTED will need to send a Sidelink UE Information message (e.g. SidelinkUEInformationNR) to gNB to request sidelink resources for transmitting the Direct Communication Request message. In case the default destination Layer-2 ID associated with the service type is used, the cast type would be set to "broadcast" because the Direct Communication Request is transmitted via a broadcast transmission. After receiving a PC5-S message (e.g. security related message or Direct Communication Accept) sent by the peer UE in response to reception of the Direct Communication Request, the initiating UE may need to send another Sidelink UE Information message to gNB to request sidelink resources for transmitting the following PC5-S messages and data packets via a unicast transmission because the L2ID of UE2 is known to UE1 after the PC5-S message is received from UE2. FIG. 13 illustrates an example of the unicast link establishment procedure.

As specified in the 3GPP email discussion [107bis #91] [V2X] 38.331 running CR (Huawei), SidelinkUEInformationNR may include the following information elements (IEs) related to the unicast link to be established: sl-DestinationIdentity, sl-CastType, sl-QoS-InfoList, sl-TypeTxSyncList, and sl-TxInterestedFreqList. And, each entry in sl-QoS-InfoList includes sl-QoS-FlowIdentity and sl-QoS-Profile. The sl-DestinationIdentity will be set to the default destination Layer-2 ID associated with the service type or a Layer-2 ID of the peer UE. In response to reception of the SidelinkUEInformationNR, gNB may reply with a RRC Connection Reconfiguration message (e.g. RRCConnection- Reconfiguration) to configure the sidelink transmission resources for the concerned unicast link.

For example, RRCConnectionReconfiguration may include IE SL-V2X-ConfigDedicated, which may contain information to indicate a resource allocation mode (either "scheduled" or "ue-selected") and/or the sidelink resource pool, etc. It may also include a PC5 QoS flow to SLRB (or SL LCH) mapping. The PC5 QoS flow may be mapped to an existing SLRB or a new SLRB. In case a new SLRB is needed, a logical channel configuration will be included for the new SLRB. It is noted that each SLRB is associated with a SL LCH.

If the sl-DestinationIdentity included in SidelinkUEInformationNR is set to the default destination Layer-2 ID associated with the service type, it means the requested sidelink resources is used for transmitting the Direct Communication Request on a SCCH (e.g. SCCH0) via a broadcast transmission. Since the configuration of the SCCH is fixed and gNB should be aware of the required QoS requirements for transmitting the Direct Communication Request, there is no need to include the sl-QoS-InfoList in the SidelinkUEInformationNR.

Alternatively, a default sl-QoS-FlowIdentity and/or a default sl-QoS-Profile could be set to the sl-QoS-InfoList for transmitting the Direct Communication Request. The gNB can be aware of requesting sidelink resources for transmitting the Direct Communication Request based on the default sl-QoS-FlowIdentity and/or the default sl-QoS-Profile. Although it is feasible to set the default sl-QoS-FlowIdentity and/or the default sl-QoS-Profile in the sl-QoS-InfoList for transmitting the Direct Communication Request, it would cause extra signalling overhead unnecessarily. Possibly, the default sl-QoS-FlowIdentity and/or the default sl-QoS-Profile for transmitting PC5-S message could be specified or pre-defended in the initiating UE. It could be specified in upper layer of the initiating UE. The upper layer passes the default sl-QoS-FlowIdentity and/or the default sl-QoS-Profile in addition to PC5-S message down to AS layer of the initiating UE for transmission. It could be also possible to specify the default sl-QoS-FlowIdentity and/or the default sl-QoS-Profile in the AS layer of the initiating UE (i.e. it is fixed in a RRC specification).

In case a UE transmits the SidelinkUEInformationNR to request sidelink resources for a normal broadcast service, the sl-QoS-InfoList still needs to be included in the SidelinkUEInformationNR. Therefore, the IE sl-QoS-InfoList should be optional. In other words, the UE includes the IE sl-QoS-InfoList in the SidelinkUEInformationNR if SidelinkUEInformationNR is used to request sidelink resources for a broadcast service. The UE does not include the IE sl-QoS-InfoList if SidelinkUEInformationNR is used to request sidelink resources for transmitting a PC5-S message (e.g. a Direct Communication Request).

Figure 14:
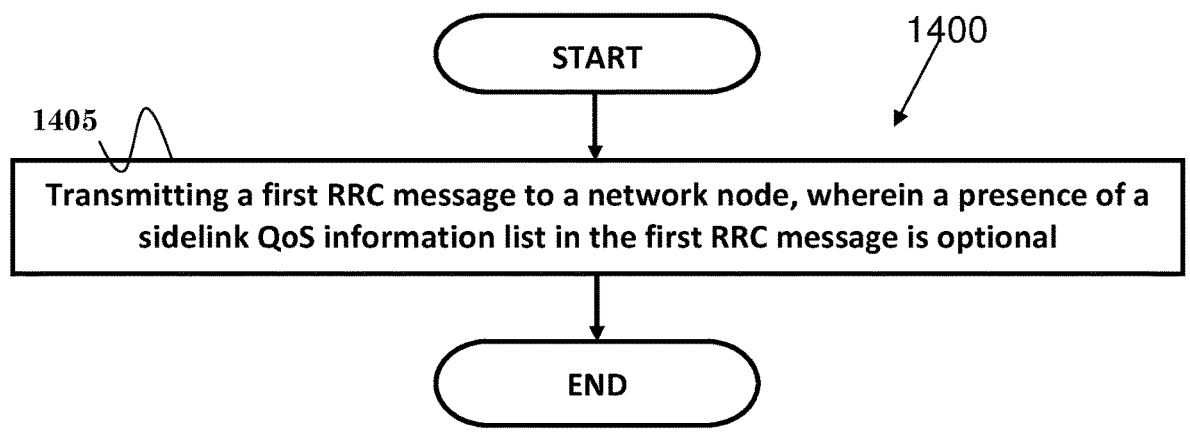
FIG. 14 is a flow chart according to one exemplary embodiment.

FIG. 14 is a flow chart 1400 according to one exemplary embodiment from the perspective of a first UE in RRC_CONNECTED to request sidelink resources. In step 1405, the first UE transmits a first RRC (Radio Resource Control) message to a network node, wherein a presence of a sidelink QoS (Quality of Service) information list in the first RRC message is optional.

In one embodiment, the sidelink QoS information list is present if the first RRC message is used to request sidelink resources for traffic transfer of a V2X service. The sidelink QoS information list is absent if the first RRC message is used to request sidelink resources for transmitting a PC5-S message used to request a direct communication with a second UE. In one embodiment, the PC5-S message could be a Direct Communication Request message.

In one embodiment, the first RRC message may also include at least one of the following information elements: a destination identity, a cast type, and/or a frequency. The sidelink QoS information list could include an information element indicating a QoS profile of a PC5 QoS flow and/or an information element indicating a PC5 QoS flow identity of the PC5 QoS flow. The first RRC message could be a Sidelink UE Information message.

In one embodiment, the first UE could receive a second RRC message from the network mode to allocate a dedicated sidelink configuration. The second RRC message or the dedicated sidelink configuration may include at least one of the following information elements: a PC5 QoS flow to SLRB (Sidelink Radio Bearer) mapping, a resource allocation mode, sidelink resource pool, and/or a logical channel configuration.

In one embodiment, the network node could be a base station (e.g. gNB).

Referring back to FIGS. 3 and 4, in one exemplary embodiment of a first UE in RRC_CONNECTED to request sidelink resources. The first UE 300 includes a program code 312 stored in the memory 310. The CPU 308 could execute program code 312 to enable the first UE to transmit a first RRC message to a network node, wherein a presence of an information element indicating a QoS profile of a PC5 QoS flow in the first RRC message is optional. Furthermore, the CPU 308 can execute the program code 312 to perform all of the above-described actions and steps or others described herein.

Figure 15:
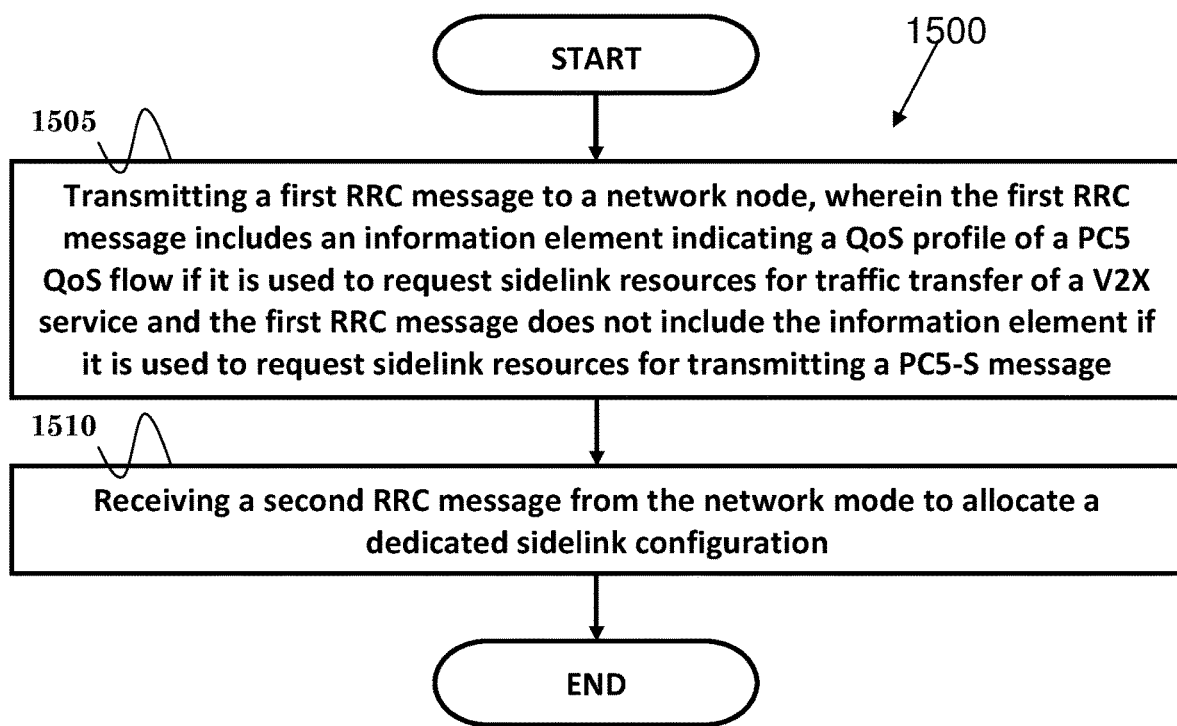
FIG. 15 is a flow chart according to one exemplary embodiment.

FIG. 15 is a flow chart 1500 according to one exemplary embodiment from the perspective of a first UE in RRC_CONNECTED to request sidelink resources. In step 1505, the first UE transmits a first RRC message to a network node, wherein the first RRC message includes an information element indicating a QoS profile of a PC5 QoS flow if it is used to request sidelink resources for traffic transfer of a V2X service and the first RRC message does not include the information element if it is used to request sidelink resources for transmitting a PC5-S message. In step 1510, the first UE receives a second RRC message from the network mode to allocate a dedicated sidelink configuration.

Referring back to FIGS. 3 and 4, in one exemplary embodiment of a first UE in RRC_CONNECTED to request sidelink resources. The first UE 300 includes a program code 312 stored in the memory 310. The CPU 308 could execute program code 312 to enable the first UE (i) to transmit a first RRC message to a network node, wherein the first RRC message includes an information element indicating a QoS profile of a PC5 QoS flow if it is used to request sidelink resources for traffic transfer of a V2X service and the first RRC message does not include the information element if it is used to request sidelink resources for transmitting a PC5-S message, and (ii) to receive a second RRC message from the network mode to allocate a dedicated sidelink configuration. Furthermore, the CPU 308 can execute the program code 312 to perform all of the above-described actions and steps or others described herein.

Figure 16:
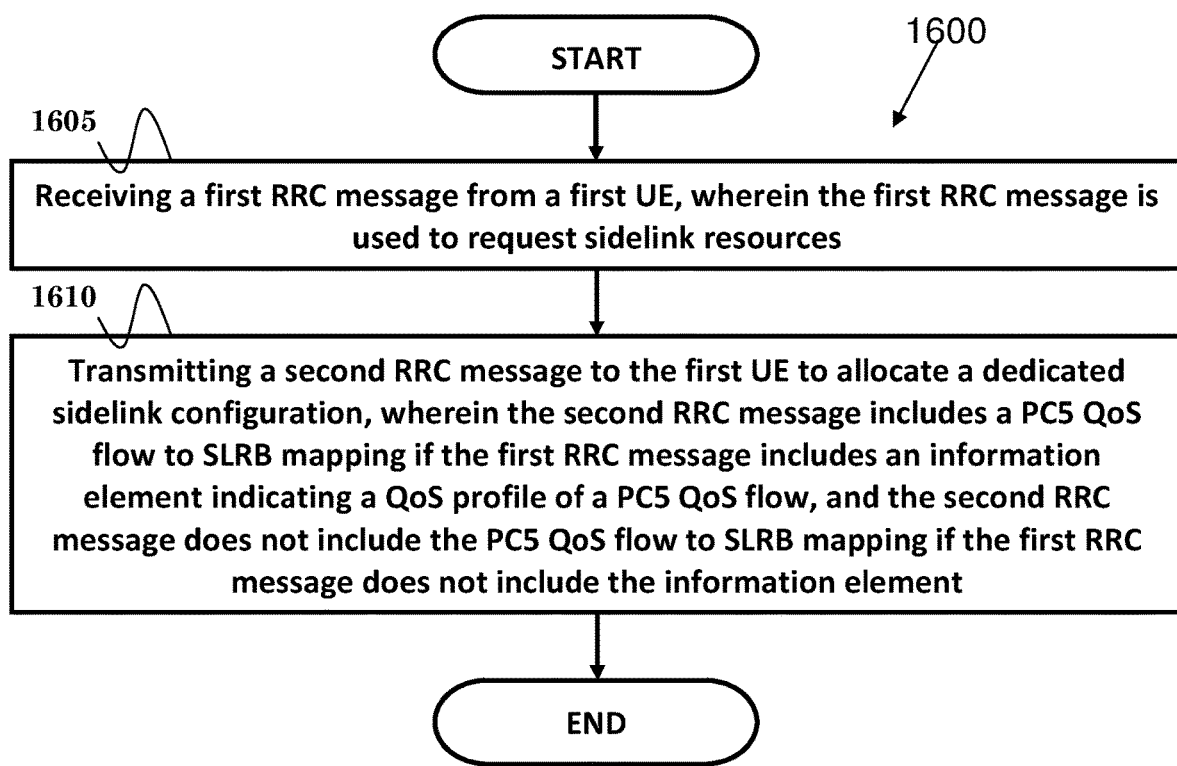
FIG. 16 is a flow chart according to one exemplary embodiment.

FIG. 16 is a flow chart 1600 according to one exemplary embodiment from the perspective of a network node to allocate sidelink resources. In step 1605, the network node receives a first RRC message from a first UE, wherein the first RRC message is used to request sidelink resources. In step 1610, the network node transmits a second RRC message to the first UE to allocate a dedicated sidelink configuration, wherein the second RRC message includes a PC5

QoS flow to SLRB mapping if the first RRC message includes an information element indicating a QoS profile of a PC5 QoS flow, and the second RRC message does not include the PC5 QoS flow to SLRB mapping if the first RRC message does not include the information element.

Referring back to FIGS. 3 and 4, in one exemplary embodiment of a network node to allocate sidelink resources. The network node 300 includes a program code 312 stored in the memory 310. The CPU 308 could execute program code 312 to enable the network node (i) to receive a first RRC message from a first UE, wherein the first RRC message is used to request sidelink resources, and (ii) to transmit a second RRC message to the first UE to allocate a dedicated sidelink configuration, wherein the second RRC message includes a PC5 QoS flow to SLRB mapping if the first RRC message includes an information element indicating a QoS profile of a PC5 QoS flow, and the second RRC message does not include the PC5 QoS flow to SLRB mapping if the first RRC message does not include the information element. Furthermore, the CPU 308 can execute the program code 312 to perform all of the above-described actions and steps or others described herein.

In the context of embodiments illustrated in FIGS. 15-16 and discussed above, in one embodiment, the first RRC message could include at least one of the following information elements: a destination identity, a cast type, and/or a frequency. The second RRC message could include at least one of the following information elements: a resource allocation mode, sidelink resource pool, and/or a logical channel configuration.

In one embodiment, the destination identity could be set to a default destination Layer-2 ID for initial signalling to establish unicast connection for a V2X service or a V2X application which offers the V2X service (e.g. PSIDs (Provider Service Identifiers) or ITS-AIDs (Intelligent Transport System-Application Identifier)) or a destination Layer-2 ID of a peer UE of the UE if the first RRC message is used to request sidelink resources for transmitting the PC5-S message. The destination identity could also be set to a destination Layer-2 ID associated with a service type of a V2X service or a V2X application which offers the V2X service (e.g. PSID or ITS-AIDs) if the first RRC message is used to request sidelink resources for traffic transfer of a broadcast service. Furthermore, the destination identity could be set to a destination Layer-2 ID associated with a groupcast service if the first RRC message is used to request sidelink resources for traffic transfer of the groupcast service. In addition, the destination identity could be set to a destination Layer-2 ID of a peer UE of the UE if the first RRC message is used to request sidelink resources for traffic transfer of a unicast service.

In one embodiment, the dedicated sidelink configuration may include at least one of the following information elements: a PC5 QoS flow to SLRB mapping, a resource allocation mode, sidelink resource pool, and/or a logical channel configuration. The PC5-S message could be a Direct Communication Request. The PC5-S message could be transmitted on a SCCH (e.g. SCCH0). The traffic transfer could be performed on a STCH (Sidelink Traffic Channel). The logical channel configuration of the SCCH could be specified or pre-defined in the UE.

In one embodiment, the network node is a base station (e.g. gNB). The first RRC message may include an information element indicating a PC5 QoS flow identity of the PC5 QoS flow.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a network node to allocate a first UE (User Equipment) in RRC_CONNECTED with sidelink resources, comprising:
   receiving a first RRC (Radio Resource Control) message from the first UE, wherein a presence of a sidelink QoS (Quality of Service) information list in the first RRC message is optional,
   wherein the first RRC message is used to:
      request sidelink resources for the first UE to transmit traffic of a V2X (Vehicle-to-Everything) service to a second UE; or
      request sidelink resources for the first UE to transmit a PC5-S message used to request establishment of a PC5 unicast link with the second UE,
   wherein the sidelink QoS information list is present in the first RRC message if the first RRC message is used to request sidelink resources for transmitting traffic of the V2X service to the second UE, and
   wherein the sidelink QoS information list is absent in the first RRC message if the first RRC message is used to request sidelink resources for transmitting the PC5-S message used to request establishment of the PC5 unicast link with the second UE; and
   transmitting a second RRC message to the first UE to allocate a dedicated sidelink configuration.

2. The method of claim 1, wherein the PC5-S message is a Direct Communication Request message.

3. The method of claim 1, wherein the sidelink QoS information list includes an information element indicating a QoS profile of a PC5 QoS flow and an information element indicating a PC5 QoS flow identity of the PC5 QoS flow.

4. The method of claim 1, wherein the first RRC message is a Sidelink UE Information message.

5. The method of claim 1, wherein the first RRC message includes a destination identity.

6. The method of claim 1, wherein the first RRC message includes a cast type.

7. The method of claim 1, wherein the first RRC message includes a frequency.

8. The method of claim 1, wherein the second RRC message includes at least one of a PC5 QoS flow to SLRB (Sidelink Radio Bearer) mapping, a resource allocation mode, sidelink resource pool, or a logical channel configuration.

9. The method of claim 1, wherein the dedicated sidelink configuration includes at least one of a PC5 QoS flow to SLRB (Sidelink Radio Bearer) mapping, a resource allocation mode, sidelink resource pool, or a logical channel configuration.

10. The method of claim 1, wherein the network node is a base station.

11. A network node, comprising:
   a control circuit;
   a processor installed in the control circuit; and
   a memory installed in the control circuit and operatively coupled to the processor;
   wherein the processor is configured to execute a program code stored in the memory to:
      receive a first RRC (Radio Resource Control) message from a first UE (User Equipment), wherein a presence of a sidelink QoS (Quality of Service) information list in the first RRC message is optional,
      wherein the first RRC message is used to:
         request sidelink resources for the first UE to transmit traffic of a V2X (Vehicle-to-Everything) service to a second UE; or
         request sidelink resources for the first UE to transmit a PC5-S message used to request establishment of a PC5 unicast link with the second UE,
      wherein the sidelink QoS information list is present in the first RRC message if the first RRC message is used to request sidelink resources for transmitting traffic of the V2X service to the second UE, and
      wherein the sidelink QoS information list is absent in the first RRC message if the first RRC message is used to request sidelink resources for transmitting the PC5-S message used to request establishment of the PC5 unicast link with the second UE; and
      transmit a second RRC message to the first UE to allocate a dedicated sidelink configuration.

12. The network node of claim 11, wherein the PC5-S message is a Direct Communication Request message.

13. The network node of claim 11, wherein the sidelink QoS information list includes an information element indicating a QoS profile of a PC5 QoS flow and an information element indicating a PC5 QoS flow identity of the PC5 QoS flow.

14. The network node of claim 11, wherein the first RRC message is a Sidelink UE Information message.

15. The network node of claim 11, wherein the first RRC message includes a destination identity.

16. The network node of claim 11, wherein the first RRC message includes a cast type.

17. The network node of claim 11, wherein the first RRC message includes a frequency.

18. The network node of claim 11, wherein the second RRC message includes at least one of a PC5 QoS flow to SLRB (Sidelink Radio Bearer) mapping, a resource allocation mode, sidelink resource pool, or a logical channel configuration.

19. The network node of claim 11, wherein the dedicated sidelink configuration includes at least one of a PC5 QoS flow to SLRB (Sidelink Radio Bearer) mapping, a resource allocation mode, sidelink resource pool, or a logical channel configuration.

20. The network node of claim 11, wherein the network node is a base station.

\* \* \* \* \*